United States Patent [19]

Li et al.

[11] Patent Number: 5,527,466
[45] Date of Patent: Jun. 18, 1996

[54] CROSS-FLOW FILTRATION APPARATUS AND METHOD

[75] Inventors: Lixiong Li; Earnest F. Gloyna; Marcel G. Goemmans, all of Austin, Tex.

[73] Assignee: Board of Regents, The University of Texas System, Austin, Tex.

[21] Appl. No.: 142,777

[22] Filed: Oct. 25, 1993

Related U.S. Application Data

[63] Continuation-in-part of Ser. No. 743,520, Aug. 9, 1991, abandoned.

[51] Int. Cl.$^6$ .................................................. B01D 65/08
[52] U.S. Cl. ........................................... 210/636; 210/652
[58] Field of Search ..................................... 210/634, 636, 210/651, 652

[56] References Cited

U.S. PATENT DOCUMENTS

| | | | |
|---|---|---|---|
| 2,944,396 | 7/1960 | Barton et al. | 60/39.05 |
| 3,449,247 | 6/1969 | Bauer | 210/63 |
| 3,464,885 | 9/1969 | Land et al. | 162/17 |
| 3,606,999 | 9/1971 | Lawless | 23/1 |
| 3,853,759 | 12/1974 | Titmas | 210/63 |
| 3,900,300 | 8/1975 | Lehman | 55/184 |
| 3,912,626 | 10/1975 | Ely et al. | 210/50 |

(List continued on next page.)

FOREIGN PATENT DOCUMENTS

| | | |
|---|---|---|
| 53091093 | 8/1978 | Japan. |
| PCT/US92/ 06459 | 12/1992 | WIPO. |

OTHER PUBLICATIONS

Chowdhury et al., "Catalytic Wet Oxidation of Strong Waste Waters", AIChE Symp. 151:71 (1975), pp. 46–58.

Freeman, *Innovative Thermal Hazardous Organic Waste Treatment Processes*, Noyes Publications: Park Ridge, New Jersey (1985), pp. 12–33.

Gloyna, "Supercritical Water Oxidation—Deep Well Technology for Toxic Wastewaters and Sludges", Technical Report, The University of Texas at Austin, 1989.

Imamura et al., "Wet Oxidation of Acetic Acid Catalyzed by Co–Bi Complex Oxides", *Ind. Eng. Chem. Prod. Res. Dev.*, 21 (4), pp. 570–575 (1982).

Lee et al., "Efficiency of Hydrogen Peroxide and Oxygen in Supercritical Water Oxidation of 2, 4-Dichlorophenol and Acetic Acid", *The Journal of Supercritical Fluids*, 3 pp. 249–255 (1990).

Lu et al., "Selective Particle Deposition in Crossflow Filtration", *Sep. Sci. and Technol.*, 24 (7&8), 517–540 (1989).

Mahlman et al., "Cross-Flow Filtration in Physical Chemical Treatment of Municipal Sewage Effluents", Oak Ridge Natl. Lab. Technical Report, EPA/600/2–76/025, Feb. 1976.

Modell et al., "Supercritical Water—Testing Reveals New Process Holds Promise", *Solid Wastes Management*, Aug. 1982.

Murkes, "Low-shear and High-shear Cross-flow Filtration", *Filtration and Separation*, 23(6), 364–365 (1986).

Murkes et al., *Crossflow Filtration: Theory and Practice*, John Wiley & Sons: New York, 1988.

(List continued on next page.)

*Primary Examiner*—Frank Spear
*Attorney, Agent, or Firm*—Arnold, White, & Durkee

[57] ABSTRACT

Apparatus and methods utilizing cross-flow filtration under supercritical conditions for water to separate/filter a feed stream or reaction mixture, remove oxides or other solids from fluids, and/or separate ion species (e.g., ions, electrolytes, or salts). Cross-flow filtration may be utilized in combination with wet oxidation of waste and wastewaters to remove organic and inorganic materials.

37 Claims, 17 Drawing Sheets

Dead-end filtration

Cross-flow filtration

U.S. PATENT DOCUMENTS

| | | | |
|---|---|---|---|
| 3,938,972 | 2/1976 | Sugimura | 55/440 |
| 4,141,829 | 2/1979 | Thiel et al. | 210/63 |
| 4,215,094 | 7/1980 | Inao et al. | 423/123 |
| 4,217,218 | 8/1980 | Bauer | 210/63 |
| 4,221,577 | 9/1980 | Lowrie | 55/392 |
| 4,229,296 | 10/1980 | Wheaton et al. | 210/758 |
| 4,263,253 | 4/1981 | Pilz et al. | 422/1 |
| 4,272,383 | 6/1981 | McGrew | 210/741 |
| 4,292,953 | 10/1981 | Dickinson | 126/263 |
| 4,298,456 | 11/1981 | Coumbs et al. | 208/86 |
| 4,326,957 | 4/1982 | Rosenberg | 210/436 |
| 4,338,199 | 6/1982 | Modell | 210/721 |
| 4,370,223 | 1/1983 | Bose | 208/125 |
| 4,377,066 | 3/1983 | Dickinson | 60/39.05 |
| 4,378,976 | 4/1983 | Rush . | |
| 4,380,960 | 4/1983 | Dickinson | 110/347 |
| 4,384,897 | 5/1983 | Brink | 127/37 |
| 4,460,628 | 7/1984 | Wheaton et al. | 427/214 |
| 4,543,190 | 9/1985 | Modell | 210/721 |
| 4,564,458 | 1/1986 | Burleson | 210/747 |
| 4,593,202 | 6/1986 | Dickinson | 290/54 |
| 4,594,164 | 6/1986 | Titmas | 210/741 |
| 4,668,256 | 5/1987 | Billiet et al. | 55/219 |
| 4,698,157 | 10/1987 | Gillot | 210/496 |
| 4,714,032 | 12/1987 | Dickinson | 110/347 |
| 4,721,575 | 1/1988 | Binning et al. | 210/761 |
| 4,733,852 | 3/1988 | Glasgow et al. | 266/227 |
| 4,767,543 | 8/1988 | Chornet et al. | 210/759 |
| 4,792,408 | 12/1988 | Titmas | 210/747 |
| 4,793,153 | 12/1988 | Hembree et al. | 62/476 |
| 4,816,140 | 3/1989 | Trambouze et al. | 208/309 |
| 4,822,394 | 4/1989 | Zeigler | 62/17 |
| 4,822,497 | 4/1989 | Hong et al. | 210/721 |
| 4,853,205 | 8/1989 | Tolley et al. | 423/472 |
| 4,861,484 | 8/1989 | Lichtin et al. | 210/638 |
| 4,861,497 | 8/1989 | Welch et al. | 210/759 |
| 4,872,890 | 10/1989 | Lamprecht | 55/323 |
| 4,880,440 | 11/1989 | Perrin | 55/16 |
| 4,891,139 | 1/1990 | Zeigler et al. | 210/747 |
| 4,898,107 | 2/1990 | Dickinson | 110/346 |
| 4,936,990 | 6/1990 | Brunsell et al. | 210/331 |
| 4,968,328 | 11/1990 | Duke | 55/1 |
| 4,983,296 | 1/1991 | McMahon et al. | 210/603 |
| 5,009,857 | 4/1991 | Haerle | 422/180 |
| 5,011,614 | 4/1991 | Gresser et al. | 210/761 |
| 5,053,142 | 10/1991 | Sorensen et al. | 210/742 |
| 5,057,197 | 10/1991 | Perry et al. | 204/801 X |
| 5,057,220 | 10/1991 | Harada et al. | 210/605 |
| 5,057,231 | 10/1991 | Mueller et al. | 210/761 |
| 5,075,017 | 12/1991 | Hossain et al. | 210/761 |
| 5,106,513 | 4/1992 | Hong | 210/759 |
| 5,133,877 | 7/1992 | Rofer et al. | 210/761 |
| 5,183,577 | 2/1993 | Lehmann | 210/761 |
| 5,192,453 | 3/1993 | Keckler et al. | 210/761 |
| 5,221,486 | 6/1993 | Fassbender | 210/757 |
| 5,232,604 | 8/1993 | Swallow et al. | 210/759 |
| 5,232,605 | 8/1993 | Baur et al. | 210/761 |
| 5,240,619 | 8/1993 | Copa et al. | 210/752 |
| 5,250,193 | 10/1993 | Sawicki et al. | 210/761 |
| 5,252,224 | 10/1993 | Modell et al. | 210/695 |

OTHER PUBLICATIONS

Opatken, "Aqueous–Phase Oxidation of Sludge Using the Vertical Reaction Vessel System", EPA/600/2–87/022, Mar. 1987.

Perona et al., "A Pilot Plant for Sewage Treatment by Cross–Flow Filtration", Oak Ridge Natl. Lab. Technical Report ORNL–TM–4659, Oct. 1974.

Shapira et al., "Removal of Heavy Metals and Suspended Solids from Battery Wastewaters: Application of Hydroperm Cross–flow Microfiltration", Gen. Battery Corp. Report EPA/600/2–81/147, Aug. 1981.

Thomason et al., "Supercritical Water Destruction of Aqueous Wastes", *Hazardous Waste,* 1(4), 453–467 (1984).

Teletzke, "Wet Air Oxidation", *Chem. Eng. Prog.,* 60(1), pp. 33–38, Jan. 1964.

Yang et al., "Homogeneous Catalysis in the Oxidation of p–Chlorophenol in Supercritical Water", *Ind. Eng. Chem. Res.,* 27(1), pp. 2009–2014 (1988).

Zimmermann, "New Waste Disposal Process", *Chem. Eng.,* pp. 117–120, Aug. 1958.

Jacobs et al., "Phase Segregation", *Handbook of Separation Process Technology,* published by John Wiley & Sons (1987).

Stone & Webster Engineering Corp., "Assessment and Development of an Industrial Wet Oxidation System for Burning Waste and Low Grade Fuels", Final Report, Work Performed Under Contract DE–FC07 881D12711, Prepared for U.S. Department of Energy, Sep., 1989.

Todheide et al., "Das Zweiphasengebiet und die kritische Kurve im System Kohlendioxid—Wasser bis zu Drucken von 3500 bar," *Zeitschrift fur physikalischo Chemie Neue Folge,* Bd. 37, 8. 387–401 (1963).

Zimmermann et al., "The Zimmermann Process and Its Applications in the Pulp and Paper Industry", TAPPI, 43(8), pp. 710–715 (1960).

Keng–Chen Chang et al., "Supercritical water oxidation of acetic acid by potassium permanganate", *J. of Hazardous Materials,* vol. 32, pp. 001–012 (1992).

Yoshiaki Harada, "Wet Catalytic Oxidation Process for Wastewater Treatment", Abstract (1991).

Sellchiro Imamura et al., "Wet Oxidation of Ammonia Catalyzed by Cerium–Based Composite Oxides", *Ind. Eng. Chem. Prod. Res. Dev.,* vol. 24, No. 1, pp. 75–80 (1985).

Lei Jin et al., "The Effect of Supercritical Water on the Catalytic Oxidation of 1–4–Dichlorobenzene", presented at AIChE Spring Meeting, Orlando, FL, Mar. 19–23 (1990), Abstract .

Dong–Soo Lee et al., "Efficiency of $H_2O_2$ in Supercritical Water Oxidation 2,4–Dichlorophenol and Acetic Acid", presented at AIChE Spring Meeting, Orlando, FL, Mar. 18–22 (1990).

Teletzke et al., "Components of Sludge and Its Wet Air Oxidation Products," *Journal WPCF,* 39(6):994–1005, 1967.

Conditt and Sievers, "Microanalysis of Reaction Products in Sealed Tube Wet Air Oxidations by Capillary Gas Chromatography," *Anal. Chem.,* 56:2620–2622, 1984.

McGinnis et al., "Conversion of Biomass into Chemicals with High–Temperature Wet Oxidation," *Ind. Eng. Chem. Prod. Res, Dev.,* 22(4):633–636, 1984.

Baker, et al., "Membrane Separation Systems—A Research & Development Needs Assessment," *Department of Energy Membrane Separation Systems Research Needs Assessment Group,* Final Report, II, Mar., 1990.

Urusova, "Phase Equilibria in the Sodium Hydroxide–Water and Sodium Chloride–Water Systems at 350–550°," *Russian Journal of Inorganic Chemistry,* 19(3):450–454, 1974.

Valyashko, "Phase Equilibria in Water–Salt Systems: Some Problems of Solubility at Elevated Temperature and Pressure," *High Temperature High Pressure Electrochemistry in Aqueous Solutions.* National Association of Corrosion Engineers, 4:153–157, 1976.

Armellini and Tester, "Salt Separation During Supercritical Water Oxidation of Human Metabolic Waste: Fundamental Studies of Salt Nucleation and Growth," *Society of Automotive Engineers,* Inc., pp. 189–203, 1990.

Dell'Orco et al., "The Solubility of 1:1 Nitrate Electrolytes in Supercritical Water," *Los Alamos National Lab Report,* LA–UR–92–3359, pp. 1–17, 1992.

Martynova, "Solubility of Inorganic Compounds in Subcritical and Supercritical Water," *High Temperature High Pressure Electrochemistry in Aqueous Solutions.* National Association of Corrosion Engineers, 4:131–138, 1976.

Armellini and Tester, "Solubilities of Sodium Chloride and Sodium Sulfate in Sub—and Supercritical Water Vapor," AIChE National Meeting, Los Angeles, California, Nov. 17–22, 1991, pp. 1–15.

FIGURE 3
Dead-end filtration
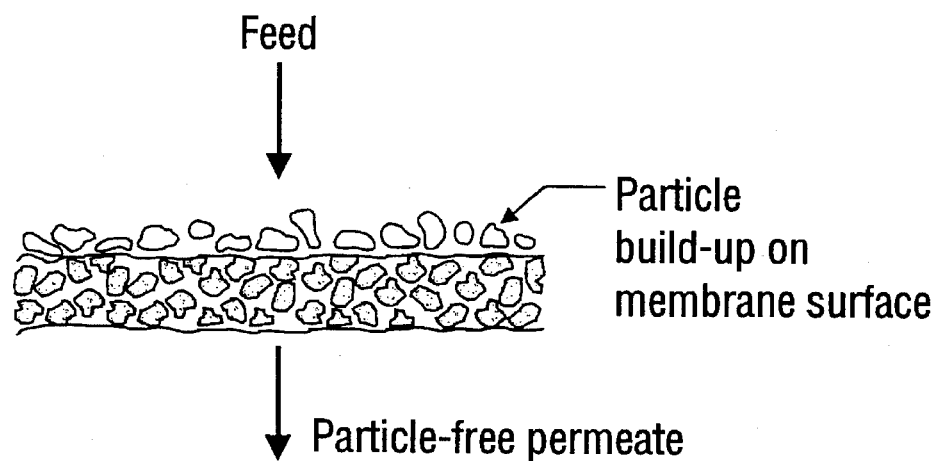
Cross-flow filtration
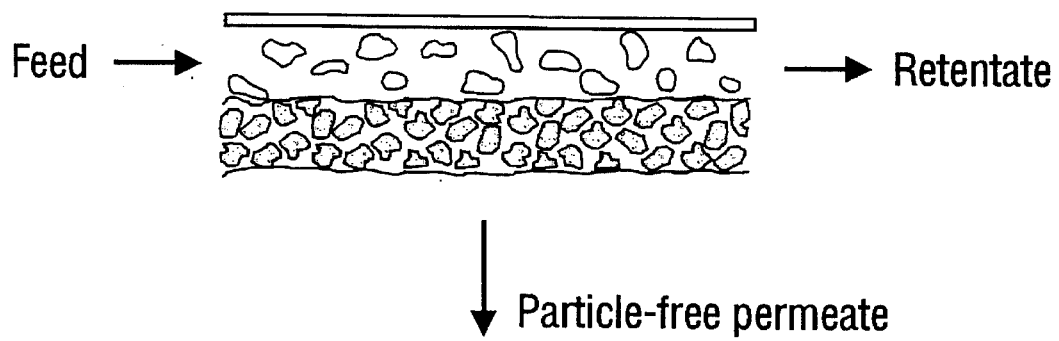

CROSS-FLOW FILTRATION APPARATUS AND METHOD

Research leading to the present invention was supported in part by the National Science Foundation Award 9112443. The U.S. government therefore has certain rights in the invention.

This application is a continuation-in-part application of Ser. No. 7/743,520 filed Aug. 9, 1991, now abandoned, incorporated by reference herein.

BACKGROUND OF THE INVENTION

1. Field of the Invention

This invention generally relates to cross-flow filtration. Wastewaters containing dissolved and/or suspended solids may be detoxified, solid and gaseous products may be separated in situ, oxides and salts may be removed from fluids, ion species may be separated, and salt solution feeds may be separated into a filtrate and a retentate by embodiments of the present invention.

2. Description of the Prior Art

Water exhibits dramatic changes in physico-chemical properties near its vapor-liquid critical point (374° C. and 22.1 MPa). At the critical point, the density varies rapidly with small changes in temperature. This transition is shown by a fluctuation in density from 0.7 g/cm$^3$ to 0.2 g/cm$^3$ over the short temperature range of 374° C. to 450° C. At its critical point the density of water is 0.32 g/cm$^3$, as compared with 1.0 g/cm$^3$ at standard temperature and pressure conditions. Under supercritical conditions density and viscosity are directly related. At 500° C. and 0.2 g/cm$^3$ and at 500° C. and 0.8 g/cm$^3$, the viscosity is about 0.04 cP and 0.10 cP respectively. Under supercritical water conditions, the density and viscosity are lower than that of water at standard temperature and pressure conditions, so diffusivity and ion mobility are expected to be higher at supercritical conditions. These properties may be utilized for solid-fluid separation.

As shown in FIGS. 1A and 1B, one of the characteristics illustrating the structure of water in the supercritical region is the static dielectric constant. This parameter is related to hydrogen bonding and reflects the concentration of polar molecules in the water. The unusually high dielectric constant value of water under standard temperature and pressure conditions is due to the strong hydrogen bonding between water molecules. As the density of water decreases, hydrogen bonding also decreases. In addition, solvent polarity is reduced. The dielectric constant is about 78.5 at standard temperature and pressure conditions. At the critical point the dielectric constant is 5.

Dissociation of water in the supercritical region is a strong function of density and temperature, as shown in FIGS. 1A and 1B. Values for the ion product ($pK_w$) first decrease from 14 at ambient conditions to 11 at 25 MPa and 250° C. and then increase to 21.6 at 25 MPa and 450° C. This means that fewer ions exist in supercritical water and that electrolyte association is favored over dissociation in the supercritical region.

Different solvation mechanisms are responsible for solubilities of salts and oxides in supercritical water. The solubility of the former is determined by ionization ability of water, while the solubility of the latter reflects the dissolution ability of water. Because of the decreased dielectric constant of supercritical water, water loses its capacity to mask charges of ions in solution, hence no extensive hydration shells are formed around inorganic electrolytes. As a result, inorganic electrolytes become insoluble under supercritical water oxidation conditions. However, the density and dielectric constant of supercritical water increase with increasing pressure. Therefore, both ionization and solubility of inorganic electrolytes are adjustable by temperature and pressure. The solubilities of selected inorganic salts and metal oxides in water are given in Table 1 for standard temperature and pressure conditions, and in Table 2 for supercritical water conditions.

TABLE 1

Properties of Selected Salts and Oxides In Water at Standard Temperature and Pressure

| Compound | Melting Point (°C.) | Density (g/cm$^3$) | Solubility (mg/L) (@°C.) |
|---|---|---|---|
| NaCl | 801 | 2.165 | 391,200 (100) |
| NaHCO$_3$ | 270 | 2.159 | 164,000 (60) |
| Na$_2$CO$_3$ | 851 | 2.533 | 455,000 (100) |
| Na$_2$SO$_4$ | 884 | 2.680 | 283,000 (100) |
| Mg(OH)$_2$ | 350 | 2.360 | 40 (100) |
| NaNO$_3$ | 306.8 | 2.261 | 921,100 (25) |
|  |  |  | 1,800,000 (100) |
| NaOH | 318.4 | 2.130 | 420,000 (0) |
| KOH | 360.4 | 2.044 | 1,070,000 (15) |
|  |  |  | 1,780,000 (100) |
| SiO$_2$ (Quartz) | 1610 | 2.660 | Insoluble |
| Al$_2$O$_3$ | 2072 | 3.965 | Insoluble |
| α-Al$_2$O$_3$ | 2015 | 3.970 | 0.98[1] |
| γ-Al$_2$O$_3$ | (1) | 3.5–3.9 | Insoluble |

[1]transition to α-Al$_2$O$_3$

TABLE 2

Solubilities of Selected Salts and Oxides in Supercritical Water

| Compound | Pressure (MPa) | Temperature (°C.) | Solubility (mg/L) |
|---|---|---|---|
| NaCl | 27.6 | 500 | 304 |
|  | 25.0 | 450 | 200 |
|  | 30.0 | 500 | 200 |
|  | 20.0 | 450 | 63 |
|  | 29.8 | 408 | 824 |
|  | 29.8 | 509 | 299 |
| Na$_2$SO$_4$ | 27.4 | 350 | 70,000 |
|  | 30.0 | 450 | 0.02 |
|  | 29.8 | 407 | 136 |
| NaHCO$_3$ | 29.8 | 509 | 86 |
| CaCO$_3$ | 24.0 | 440 | 0.02 |
| Mg(OH)$_2$ | 24.0 | 440 | 0.02 |
| NaNO$_3$ | 27.6 | 450 | 991 |
|  | 27.6 | 475 | 630 |
|  | 27.6 | 500 | 540 |
| SiO$_2$ | 34.5 | 400 | 637 |
|  | 34.5 | 500 | 216 |
|  | 25.0 | 450 | 55 |
|  | 30.0 | 450 | 160 |
| CuO | 31.0 | 620 | 0.015 |
|  | 25.0 | 450 | 0.010 |

The selection of an appropriate solids separation system must be based on the desired particle removal efficiencies and the physical process constraints. Particles to be removed in supercritical water oxidation of wastewater and sludges typically range between 0.1 and 10 microns. Microfiltration is capable of removing particles of this size.

FIG. 3 shows the operational principles for both cross-flow filtration and "dead-end" filtration. The advantage of the cross-flow filtration is that the feed suspension flows perpendicular to the filter surface at high shear rates to prevent solids build-up. The pressure drop that occurs over the filter element acts as the driving force for mass transfer. The pressure drop is a major factor to determine the maximum achievable flux rate across the membrane.

The filtration flux across the membrane can be reduced by clogging of the pores and the formation of a surface layer on top of the filter element. Clogging of the pores is caused by particles smaller than the pore size. The extent of clogging is dependent on pore shape as well as on particle size distribution and particle shape. The cake consists of a layer of particles with size equal or greater than the pore diameter. At some equilibrium thickness, the fluid shear force on the surface will equal the particle attraction to the membrane. At this point the layer reaches its maximum thickness. The fluid shear force increases with increasing fluid velocity, as a result, the thickness of the surface layer decreases and the flux over the filter element increases.

U.S. Pat. No. 4,378,976 describes an apparatus for removing solid particles and/or liquid droplets from a gas stream comprising a heating means in combination with a sonic agglomerator and a porous cross flow filter. U.S. Pat. No. 4,822,497 describes an aqueous-phase oxidizer and solids separator reactor, in particular, a two zone pressure vessel in which precipitates and other solids fall or are sprayed from a supercritical temperature super zone into a lower temperature sub zone.

A solution to the solids problem provided by an aspect of the present invention is to remove precipitates within the supercritical region using cross-flow filtration.

ABBREVIATIONS cP=centipoise

MPa=megapascal

SCW=supercritical point of water (about or above 705° F. [374° C.] and about or above 3205 psia [221 bar])

SCWO=supercritical water oxidation process

SUMMARY OF THE DISCLOSURE

The invention generally relates to crossflow filtration separation methods and apparatus which are usable under supercritical conditions for water to: i) separate/filter a feed stream or reaction mixture, ii) remove oxides or other solids from fluids, and/or iii) separate ion species (e.g., ions, electrolytes, or salts).

When used to separate ion species, the method includes the steps of (i) introducing a feed stream into a separator at supercritical conditions for water to form a supercritical feed stream, the supercritical feed stream including at least a first ion species and a second ion species, and (2) contacting the supercritical feed stream with a porous crossflow filtration element to form a filtrate and a retentate such that either the filtrate or the retentate comprises a greater weight percent of the first ion species than the weight percent of the first ion species in the supercritical feed stream.

"Ion species" is defined to include associated ion species (e.g., molecules or salts), dissociated ion species, droplets, clusters and micelles. It is understood that water and its dissociated ions are considered ion species. In a preferred application the ion species is a salt that is introduced in the feed stream, and then heated to supercritical conditions for water. Such salts may include, e.g., sodium nitrate, sodium chloride, sodium sulfate, phosphates, and the like, and these salts may be separated non-chemically and non-electrically into acidic and basic components. This separator method and apparatus may yield products which have higher commercial values than the feed stream salts.

Preferably either the filtrate or the retentate includes a lower weight percent of the first ion species than the weight percent of the first ion species in the supercritical feed stream. In a preferred method, the filtrate includes a higher weight percent of the first ion species than the weight percent of the first ion species in the supercritical feed stream, and the filtrate comprises a lower weight percent of the second ion species than the weight percent of the second ion species in the supercritical feed stream. Alternately, the retentate may include a higher weight percent of the first ion species than the weight percent of the first ion species in the supercritical feed stream, and the retentate comprises a lower weight percent of the second ion species than the weight percent of the second ion species in the supercritical feed stream.

It has been found that the feed stream preferably includes a first ion species (e.g. an inorganic salt) with a melting point lower than the temperature of the feed stream at supercritical conditions for water, but which is substantially insoluble at supercritical conditions for water. In this manner the first ion species may be dissolved in the feed stream at subcritical conditions for water (e.g, at 300° C. and 20 MPa). When subsequently raised to supercritical conditions, the first ion species will then become substantially less soluble, thus allowing the crossflow filtration element to separate this ion species.

To separate an aqueous salt into its basic and acidic associated species, the filtrate may have a higher (or lower pH) than the pH of the feed stream while the retentate simultaneously has a lower (or higher) pH than the pH of the feed stream. In a preferred embodiment the filtrate has a pH that is at least 2 pH units (and preferably at least 3–4) above or below the pH of the retentate. One additional step of the invention involves measuring the pH of feed stream, filtrate or retentate using a pH monitor (see monitor 702 in FIG. 16).

In one embodiment the feed stream included a sodium nitrate solution and the filtrate had a lower pH than the supercritical feed stream and included a higher weight percent of $HNO_3$ than the weight percent of $HNO_3$ in the supercritical feed stream, and the retentate had a higher pH than the supercritical feed stream and included a higher weight percent of NaOH than the weight percent of NaOH in the supercritical feed stream. Thus, in effect, aqueous sodium nitrate was separated into its $HNO_3$ and NaOH components, which are more commercially valuable than the sodium nitrate salt.

In an alternate embodiment the feed stream may include brine and the filtrate has a lower pH than the pH of the supercritical feed stream and includes a higher weight percent of HCl than the weight percent of HCl in the supercritical feed stream, and the retentate has a higher pH than the supercritical feed stream and included a higher weight percent of NaOH than the weight percent of NaOH in the supercritical feed stream.

In one embodiment of the invention the feed stream was introduced into a separator comprising a central chamber open at one end and closed at the other end, the central chamber being substantially surrounded by an annular chamber having a common wall with the central chamber, the wall including the porous crossflow filtration element and adapted to allow fluid to flow from the central chamber to the annular chamber, or vice versa. The separator may be adapted to exchange heat between the filtrate or retentate, and the feed stream.

The feed stream flowrate, feed stream temperature, separator temperature, or feed stream first ion species weight percent may separately or jointly be varied or controlled as a function of the pH of the filtrate, retentate, or feed stream (see controller 700 in FIG. 16). Alternately, the feed stream flowrate, feed stream temperature, separator temperature, or feed stream first ion species weight percent may be varied or controlled as a function of the weight percent of an ion species in the filtrate or retentate (see controller 700 in FIG. 16).

In one embodiment solids such as alumina or silica may be introduced into the feed stream that are adapted to increase ion species aggregation in the separator during use.

Differential pressure across the crossflow filtration element may be controlled by varying the flowrate of the filtrate, retentate, or both.

The supercritical feed stream may be contacted with the crossflow filtration element such that solids in the supercritical feed stream are separated from the filtrate, either separately or simultaneously with the ion species separation. In this embodiment the retentate has a higher weight percent of solids than the weight percent of solids in the filtrate.

The feed stream may be reacted with an oxidant-containing stream at supercritical conditions for water prior to or simultaneous to contact with the crossflow filtration element. For instance, the feed stream may be reacted with an oxidant-containing stream in a reaction zone at supercritical conditions for water for a time sufficient to oxidize organic matter to an oxidation product stream including water and carbon dioxide. Thereafter the product stream may be contacted with a porous crossflow filtration element at supercritical conditions for water to separate solids from the product stream. The product stream may also be subsequently cooled by, for instance, heat exchange with the reactants in the reaction zone. Some of all of the cooled product stream may also be recycled to mix with the feed stream prior to or simultaneous with the introduction of the oxidant-containing stream.

The reaction may take place in the presence of a catalyst. Furthermore, carbon dioxide may be separated from the reaction fluid by preferentially permeating carbon dioxide through a porous filter element (see application Ser. No. 07/743,520 filed Aug. 9, 1991). In addition, carbon dioxide may be segregated from the reaction fluid prior to preferentially permeating carbon dioxide through the porous material. Id.

Materials such as metals and/or alloys, ceramics, or metal oxides with or without a noble or transition metal coating may be used for the porous crossflow filtration element materials. The porous materials may be incorporated into cylindrical shapes, such as pipes and tubes, or other geometric forms. Preferably the pores sizes are from 0.2 to 100 microns, more preferably 0.2 to 20 microns. In one embodiment of the invention the crossflow filtration element was made of sintered metal with 0.5 micron average diameter pore sizes.

BRIEF DESCRIPTION OF THE DRAWINGS

FIG. 3 shows the operational principles of cross-flow filtration and "dead-end" filtration.

DETAILED DESCRIPTION OF THE PREFERRED EMBODIMENTS

The present invention provides for the use of cross-flow microfiltration to remove inorganic salts from supercritical water under isothermal conditions. A high-pressure, high-temperature cross-flow filter was attached to a 150 L/hr supercritical water oxidation pilot plant. The cross-flow filtration setup consisted of the feed distribution, heating (heat exchangers and heater), cross-flow filter, filtrate collection, and retentate collection systems.

Figure 1A:
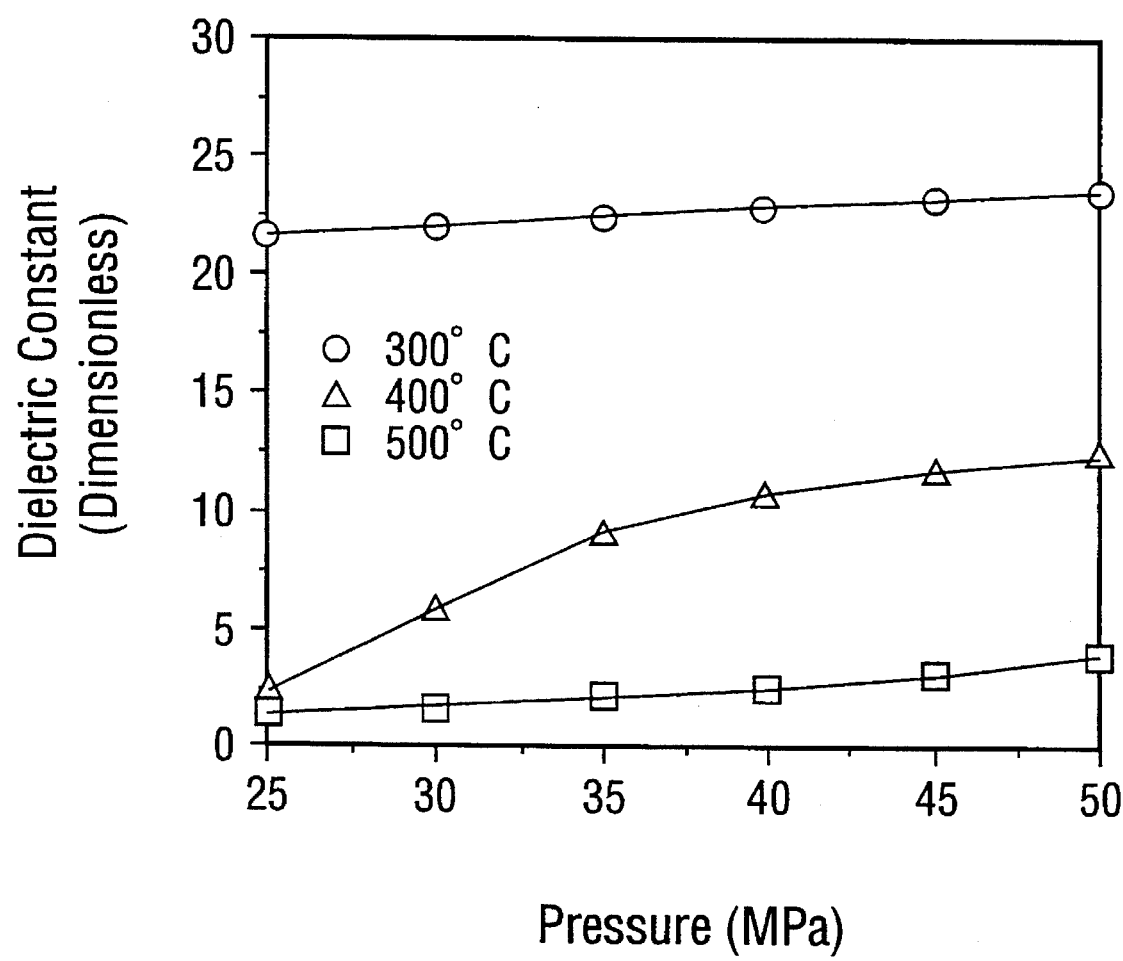
FIGS. 1A and 1B show the dielectric constant and $pK_w$ of water as a function of temperature and pressure.
Figure 1B:
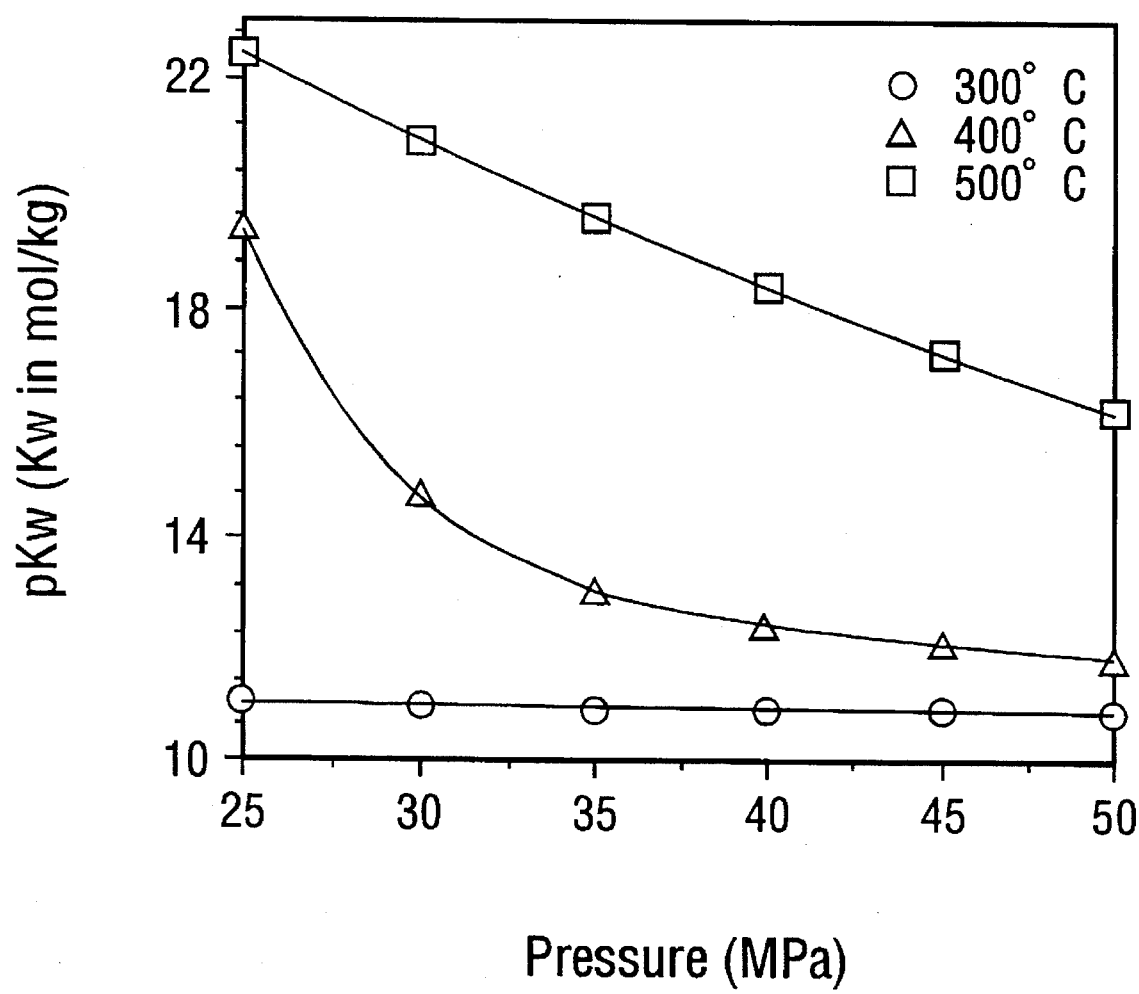
Figure 2:
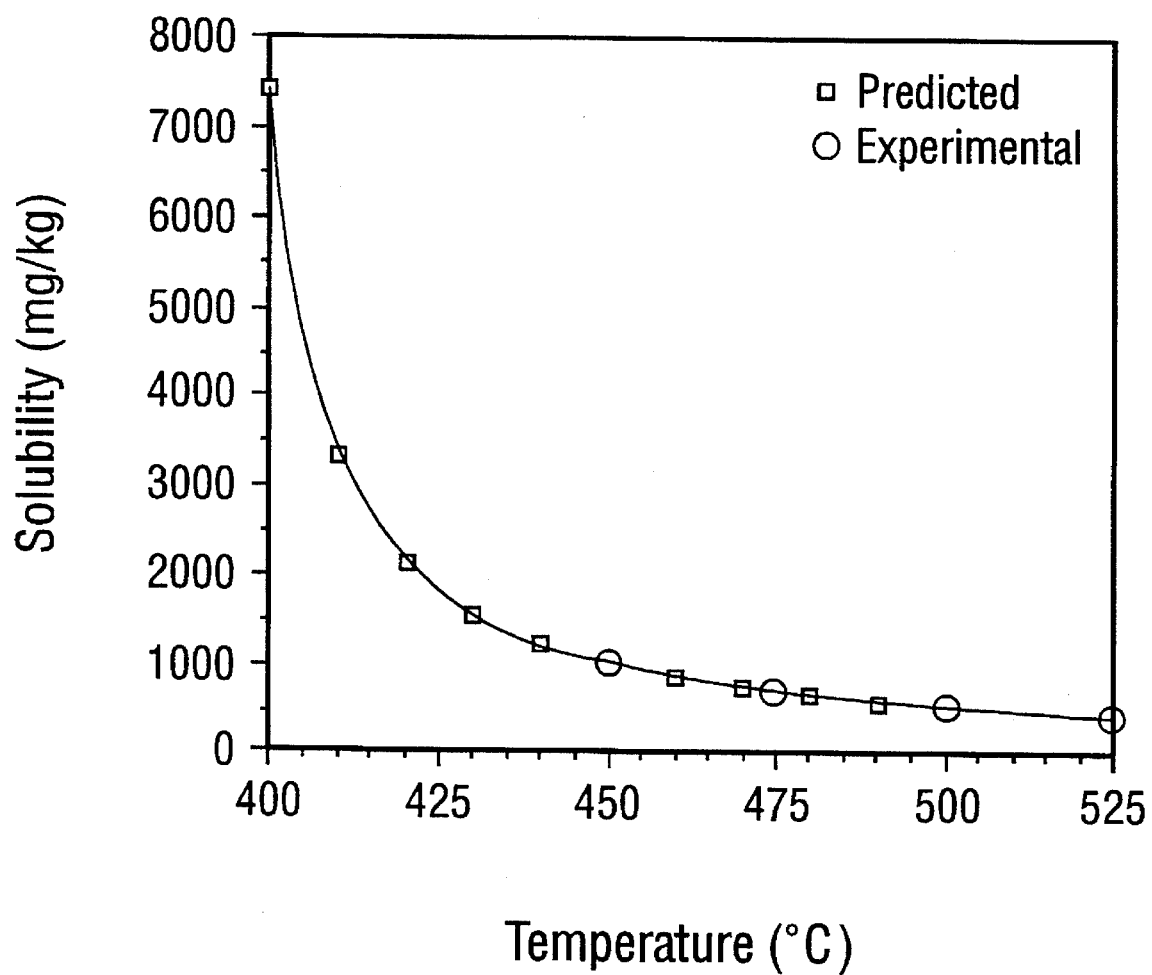
FIG. 2 shows solubility of $NaNO_3$ in supercritical water at 27.6 MPa as a function of temperature.
Figure 4:
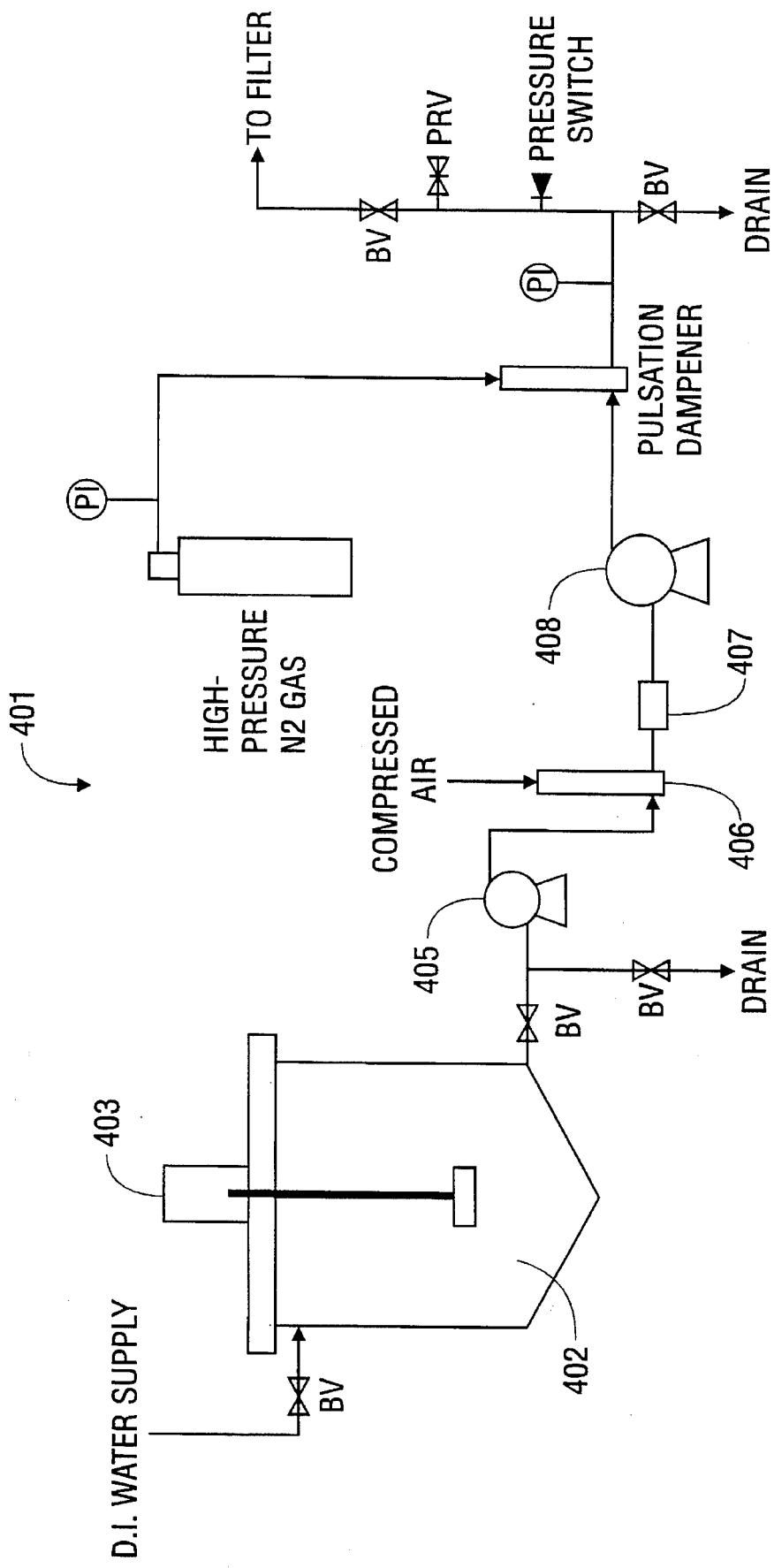
FIG. 4 shows the feed distribution system.

Feed Distribution System. A flow diagram of the feed distribution system is shown in FIG. 4. An 830-L, SS 316 tank 402 served as feed reservoir. Filtered, deionized tap water (resistivity<200,000 ohm-cm) was used. The water flow was metered by an Emerson (Model 1/2 ER) volumetric flow meter. Mixing in the tank was achieved by a five horsepower mechanical mixer 403 (Baldor Electric, Model No. VL 3504, Fort Smith, Ark.), mounted in the lid of the feed tank 402.

Stainless steel (SS) 316 tubing (12.70 mm OD, 9.20 mm ID) led from the top of the cone of the feed tank to a centrifugal pump 405 (Dayton Electric Mfg., Model No. 6K580A, Chicago, Ill., 0.5 horsepower) that provided the necessary inlet net positive suction head for the feed pump 408 (American LEWA Model No. EH-1, Holliston, Mass.). The feed pump 408 was rated at 152 L/hr (40 gal/hr). A pulse dampener 406 (filled with compressed gas) and a mass flow meter 407 (Fisher Porter Model 10MMI 102ADBBAAB, Warminster, Pa.) were installed between the centrifugal pump 405 and the feed pump 408. After the dampener, SS316L tubing (6.35 mm OD, 3.05 mm ID) led to a SOR pressure switch (SOR, Olaphe, Kan., Model No. 3NN-KK45-P1-C1APP) that automatically shutoff the pump if the system pressure exceeded 31.2 MPa. A pressure relief valve (Nupro Model No. SS- 4R3A set for 33 MPa, Willoughby, Ohio) was installed as a back up. An additional 380-L feed tank was available. This tank was always filled with deionized tap water. The water was used to rinse the supercritical water oxidation system or used as a back up water supply in case the feed tank 402 ran empty. All wetted parts were made of SS316, although other alloy materials compatible with feed stock may be used.

For particle experiments, a modification in the feed distribution system was made. Previous experiments with $SiO_2$ and $ZrO_2$ indicated problems of particles sticking to the wall of the electrical heater. Due to the electrical field inside the heater these electrically charged particles were attracted to the heater walls. This particle deposition layer caused a significant decrease in heat transfer from the heater to the feed during the processing of concentrated suspensions (C>1000 mg/L). As a result, the desired fluid temperature could not be reached, while the heater skin temperature continued to increase.

To solve this problem, an injection device was installed vertically three meters before the filter inlet. The injection device consisted of a 2.3 meter long SS316L tube (38.10 mm OD, 19.05 mm ID). The tube was filled with a concentrated suspension. Pressurized water delivered the force necessary to inject the suspension into the feed. An HPLC pump (Scientific Systems Inc. Model 200B, State College, Pa.) provided the water pressure. The injection rate could be adjusted to provide the desired suspension-to-water ratios.

Heating System. The pressurized feed stream (27.6 MPa) was preheated by two seven meter long heat exchangers for heat recovery from the effluent stream. After the heat exchangers, the feed entered a 6.60 meter long (25.40 mm OD, 12.70 mm ID) electrical resistance heater (Hynes, Mountainside, N.J., one-phase current of 35 Amps maximum). The fluid temperature at the heater outlet was controlled by a Fisher Porter process control system (LOC Model No. 40CC2000-A3). Heater skin temperatures were measured at four places along the heater. Heater core temperatures were measured at the heater inlet and at two places along the heater. Thermocouples (type K inconel sheathed) were used. The thermocouple signals were fed to an electronic interlock system to prevent heater temperature from exceeding 590° C. All hot vessels and tubings were insulated with two layers of 25.4 mm thick Kaowool ceramic fiber. The cross-flow filter was insulated with Kaylo pipe insulation and several layers of 25.4 mm thick Kaowool ceramic fiber insulation.

Figure 6:
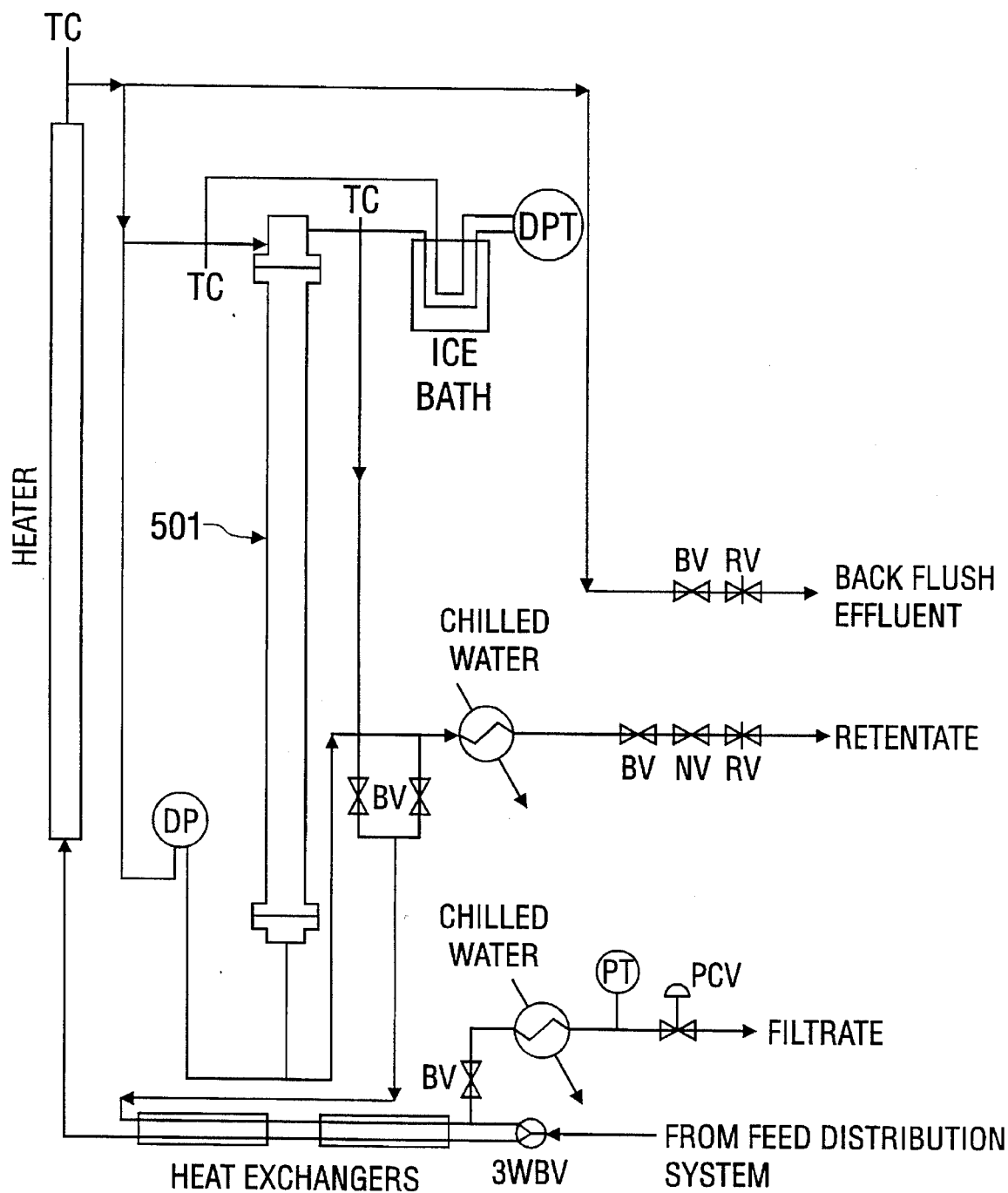
FIG. 6 shows a flow chart of the experimental configuration during salt separation experiments. BV=Ball Valve, NV=Needle Valve, RV=Relief Valve, TC=Thermocouple, DP=Diff. Pressure Gauge, PT=Pressure Transducer, DPT= Diff. Press. Transducer, PCV—Pressure Control Valve, 3WBV=3-Way Ball Valve.

Since filtrate left the filter through the filter head, extended heat-up times (three hours or more) were required to establish isothermal conditions at the bottom half of the filter. The heat-up times were decreased if all the filter effluent was pulled from the bottom of the filter prior to passage through the heat exchangers. However, during salt separation studies 80% to 90% of the feed was collected as filtrate. Therefore, a connection between the bottom of the filter and the heat exchangers was incorporated (FIG. 6). During the heat up phase of the experiment, the filtrate line was blocked and all the flow was pulled from the bottom of the filter. Once isothermal conditions were reached, the connection line was blocked and the filter line opened.

Figure 5:
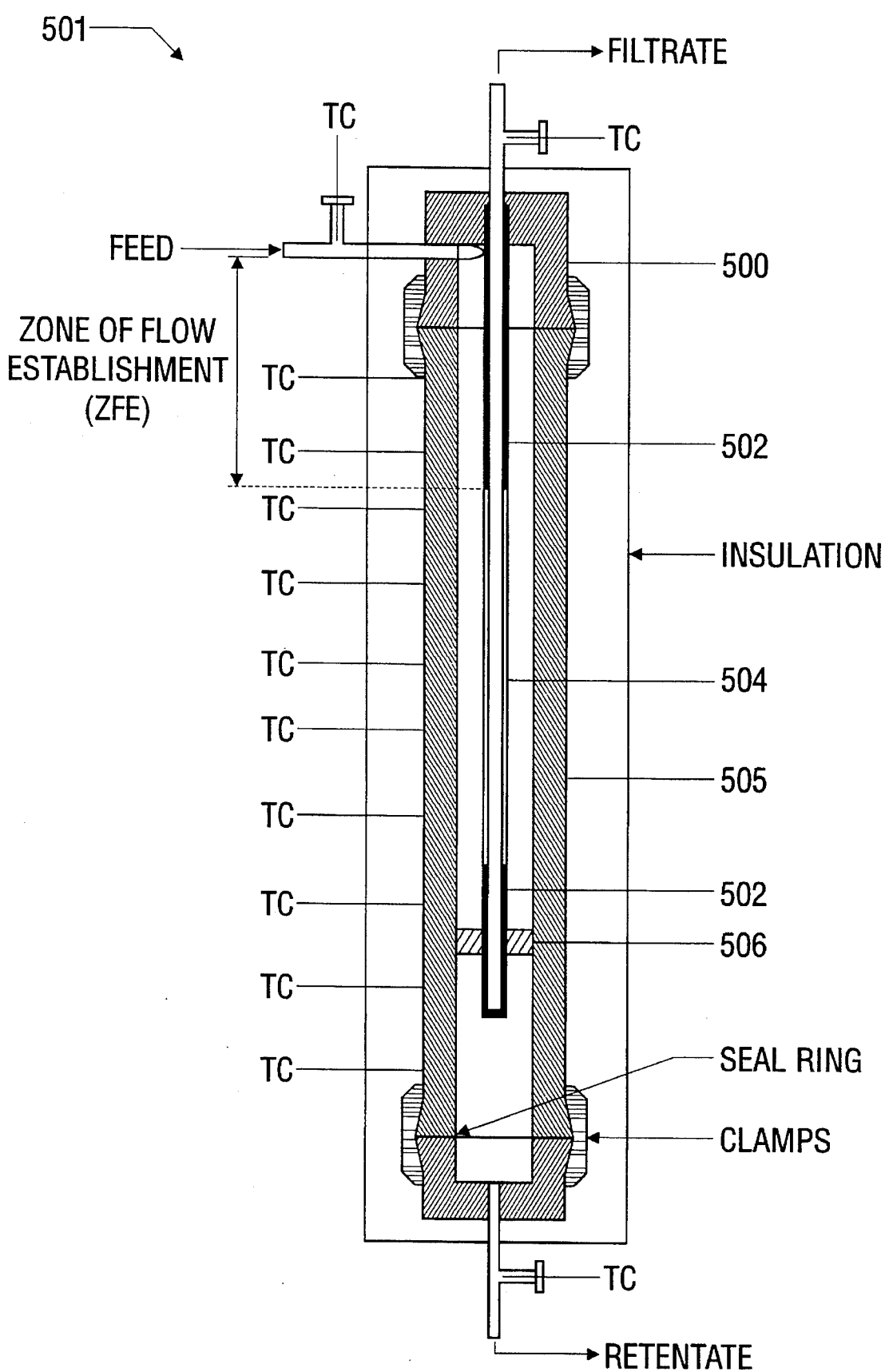
FIG. 5 shows the cross-flow filter used in salt separation experiments.

Cross-Flow Filter Assembly 501. As shown in the cross-flow filter configuration tested (FIG. 5), a 2.1 meter long porous SS316L tube 504 (25.40 mm OD, 19.05 mm ID, 0.5 μm pore size, Newmet-Krebsoge Inc., Terryville, Conn., and Mott Metallurgical Corp., Farmington, Conn.) was used as filter element. One meter long extension tubes 502 (not porous) were welded on either side of the filter element to eliminate boundary effects. The filter housing 505 was a 6.1 meter long SS316L tube (88.90 mm OD, 50.80 mm ID). The filter element was plugged at one end and attached to a specially designed filter head 500 at the other end. Four spacers 506 at the end of the filter element assured equal spacing along the filter between the filter and the filter housing. The filter head and the bottom of the filter housing were attached to the filter housing by Re-Flange R-CON connectors. The skin temperature of the filter housing was measured by type K inconel sheathed thermocouples located at 0.61 meter intervals. The thermocouples were attached to the filter housing using metal clamps. All thermocouples were connected to the Fisher Porter control system. The filter housing, flanges and filter head were fabricated by Reflange, Inc. (Houston, Tex.). The cross-flow filter was designed for 34.5 MPa at 455° C. Porous metal filters having pore sizes ranging from 0.2μ to 20μ may be used, a preferred pore size is 0.5μ.

The feed stream entered the filter through the reactor head and flowed down through the annulus section, axial to the filter element. Filtrate was returned through the center tube up to the reactor head. The retentate was continuously pulled from the bottom of the filter housing. Feed, filtrate and retentate temperatures were measured. The transmembrane pressure drop was recorded by a differential pressure transducer (Sensotec, Inc. Model No. HI-A-5/8059-01, Columbus, Ohio; 0–2.07 MPa differential pressure). Connection tubes to the differential pressure transducer were cooled.

Filtrate Collection System. Different filtrate collection systems were used for the salt and particle separation experiments. For the salt separation experiments 80% to 90% of the feed flow was collected as filtrate. As a result, the filter was operated as a semi-cartridge filter with a continuous collection of a concentrated phase. For the particle separation experiments only 10% to 20% of the feed stream was collected as filtrate, which is typical for cross-flow filtration applications. Because of limitations of the heater capacity, the streams with a larger portion were passed through the heat exchangers to maximize the heat recovery.

For the salt separation experiments, approximately nine meters of heavy insulted tubing separated the reactor head from the two heat exchangers (FIG. 6). Additional cooling of the filtrate was provided by heat exchangers cooled by chilled water. Prior to entering pressure let-down equipment a ball valve (Whitey Model No. W-1188, Highland Heights, Ohio) was installed as part of the back flush equipment. Pressure regulation was achieved by a Badger control valve (Model No. 1017, Tulsa, Okla.) interfaced with the Fisher Porter control system. Filtrate mass flow rates were measured by a Fisher Porter mass flow meter (Model No. 10 MMI 102ADBBAAB). The filtrate was then collected in a 60 liter plastic tank. The weight was measured over time, and samples were taken prior to discharge.

For the particle separation experiments, approximately five meters of uninsulated tubing (12.70 mm OD, 9.19 mm ID) separated the filter head from a ten meter long water cooled heat exchanger. Ten meters of uninsulated tubing connected the heat exchanger with two needle valves (Whitey Model No. SS-3VS4) and one relief valve (Nupro Model No. SS-4R3A set for 27.5 MPa) in series. The filtrate was then collected in a 30 liter plastic tank. The weight was measured over time, and samples were taken prior to discharge in a 208 liter metal drum.

Retentate Collection System. The same experimental setup was used for the retentate collection during the salt separation experiments as described for the filtrate collection during the particle separation experiments. Approximately three meters of uninsulated tubing (12.70 mm OD, 9.19 mm ID) separated the bottom of the filter housing with the water cooled heat exchangers (FIG. 6).

For the particle separation experiments, the retentate stream was fed into a cyclone prior to discharge into the heat exchangers and pressure control system as described for the filtrate collection during salt separation experiments. Retentate was not recycled to the feed during the experiment to insure a constant feed concentration and representative sampling of the retentate stream. Therefore, particles in the retentate needed to be separated from the fluid to prevent erosion of the pressure control valve and clogging of the gas-liquid separator. Approximately 8 m and 3 m for the second and third filter configuration, respectively, separated the bottom of the filter housing to the cyclone feed port. The cyclone had a diameter of 25.4 mm and was attached to a 2.2 meter long underflow pot (88.9 mm OD, 50.8 mm ID). The underflow pot was held at isothermal conditions by four ceramic split type tubular heaters (Mellen Model 11-420, Penacook, N.H.). These heaters were controlled by two temperature controllers (Omega Model No. CN9111A, Stamford, Conn.) with two contacters (Allen Bradley Model No. 500L-BAD93, Fairfield, N.J.).

The present separation methods may apply to supercritical fluids other than supercritical water. Other fluids may be carbon dioxide, ammonia, acetic acid or polar compounds where the associated ion species (salts, clusters, droplets or micelles) become insoluble under supercritical conditions for a fluid.

Associated molecular species are soluble under standard temperature and pressure conditions and may be comprised of anions and cations. Examples of anions include, but are not limited to, chloride, fluoride, sulfate, phosphate and nitrate anions. Examples of cations include, but are not limited to, sodium, potassium, calcium, magnesium, aluminum, cesium and copper. A solid such as a metal oxide (e.g., silica or alumina) may be added to the feed stream for purposes of nucleation to aggregate associated ion species.

EXAMPLE 1

SALT SEPARATION UTILIZING CROSS-FLOW FILTRATION

Two inorganic salts, sodium nitrate (A.C.S. Reagent, crystals, Aldrich or E.M. Science) and sodium carbonate (A.C.S. Reagent, granular, 99% +, Aldrich, Milwaukee, Wis.) were tested. The selection of the salts was based on potential corrosion impact, the melting point and rheology. The melting point of sodium nitrate (306.8° C. at atmospheric pressure) is below the operation temperature, while the melting point of sodium carbonate (851° C. at atmospheric pressure) is above the operation temperature.

At the beginning of each experiment, water (tap or deionized) was pumped into the system and the heater was turned on. After the system conditions were stabilized at the desired temperature and pressure for at least 15 minutes, the salt solution or oxide suspension (Example 2) was introduced. Mass flow rates of the feed stream, flow rate of the filtrate stream (salt separation experiments) or retentate stream (particle separation experiments Example 2), system pressure, differential pressure across the filter element and filter temperatures were monitored with the Fisher Porter LOC System. The differential pressure across the filter was also displaced on a DP gauge. All effluents were collected and weighed over time to verify the mass flow meter readings.

For each experiment, samples were taken every 10 to 20 minutes from the filtrate and retentate collection tanks, and the mass of effluent and collection time were recorded. About 200–300 mL were collected for each sample in new polypropylene bottles (U.S. Plastic Corp., Lima, Ohio). Feed samples were taken from the feed tank every 20 to 30 minutes. After each experiment the system was rinsed with at least five reactor volumes of deionized or tap water. This rinse water was also collected, the weight was recorded and additional samples were taken.

The feed tank was emptied and rinsed with tap water and deionized water before a new feed solution was prepared. The feed tank was then filled with deionized or tap water and the next feed solution was prepared. After the system conditions stabilized at another desired temperature, system pressure, pressure differential across the filter and flow rates, the pressure drop and filtrate flow were recorded. This was done to determine the characteristics of the filter element and its change over time. Once the filter characteristics were recorded the feed stream was switched to the prepared solution and the preceding sampling and data collection methods were repeated.

Experimental Analysis. Sample analysis that were required included the determination of the pH and ion concentrations of all streams during salt separation experiments.

pH. An Orion pH meter (Model SA 720) was used. The meter was calibrated using Fisher Scientific pH standards (pH 4, 7, and 10).

Inorganic Salts. Prior to analysis, samples were diluted with acidified (1.5% $HNO_3$), distilled, deionized water to bring them in the range of the analytical equipment. Sodium and chromium ion concentrations were determined using a Perkin Elmer Plasma 40 Emission Spectrometer. Nitrate, nitrite and chloride ion concentrations were determined by ion chromatography (IC) using a Dionex System 14 Ion Chromatograph. The column used was a Dionex Ionpac AS3 column, and the eluent was a 2.40 mM sodium carbonate, 3.00 mM sodium bicarbonate solution, the eluent flow rate was two mL/min. All samples were filtered through a 0.45 micrometer filter before analysis.

Salt Separations. Salt separations were initially performed using sodium carbonate, however, sodium carbonate plugged the filter in less than 10 min after the feed was introduced. Sodium nitrate did not show any plugging problems. The test conditions and results, respectively, for sodium nitrate experiments are summarized in Table 3 and 4.

TABLE 3

| | Test Matrix for Sodium Nitrate Experiments | | | |
|---|---|---|---|---|
| Experiment ID Number | Feed Concentration (mg/L) | Temperature[1] (°C.) | Feed Flow Rate[2] (kg/hr) | Filtrate Flow Rate[3] (kg/hr) |
| 2-1 | 5,150 | 422–445 | 73 | 65 |
| 2-2 | 4,770 | 455–470 | 70 | 63 |
| 2-3 | 4,970 | 401–402 | 96 | 86 |
| 2-4 | 4,830 | 434–444 | 93 | 84 |
| 2-5A | 5,150 | 435–446 | 94 | 75 |
| 2-5B | 5,150 | 435–446 | 94 | 94 |
| 2-6 | 5,150 | 428–439 | 113 | 102 |

TABLE 3-continued

Test Matrix for Sodium Nitrate Experiments

| Experiment ID Number | Feed Concentration (mg/L) | Temperature[1] (°C.) | Feed Flow Rate[2] (kg/hr) | Filtrate Flow Rate[3] (kg/hr) |
|---|---|---|---|---|
| 2-7   | 10,900 | 423–438 | 65  | 61  |
| 2-8   | 14,000 | 423–438 | 63  | 57  |
| 2-9   | 19,600 | 425–439 | 63  | 57  |
| 2-10  | 21,300 | 430–442 | 73  | 65  |
| 2-11  | 21,300 | 403–404 | 97  | 87  |
| 2-12  | 21,300 | 431–439 | 95  | 85  |
| 2-13  | 22,500 | 384–424 | 111 | 100 |
| 2-14A | 4,070  | 417–433 | 50  | 42  |
| 2-14B | 4,070  | 418–437 | 62  | 56  |
| 2-14C | 4,070  | 425–440 | 86  | 77  |

[1]Temperature was measured at exterior of filter housing. Reported values were the minimum and maximum temperatures observed during each experiment.
[2]Flow rate variations were within ±5%.
[3]All tests were conducted at a pressure of 27.6 MPa.

The effects of the feed concentration, feed flow rate, and filtrate flow rate on the filtrate concentration were also evaluated. First the effects of the individual experimental variables were analyzed. The individual effects were then combined and expressed as the effect of the salt flux onto the filter. In particular, the filtrate concentration was found to be a stronger function of the salt concentration in the feed than the hydrodynamic properties of the fluid medium. Therefore, the filtrate concentration was expressed as a function of the salt flux onto the filter. The salt flux was defined as:

$$J_{salt} = \frac{Q_{filtrate} * C_{feed}}{3600 \cdot A_{filter}}$$

Figure 7:
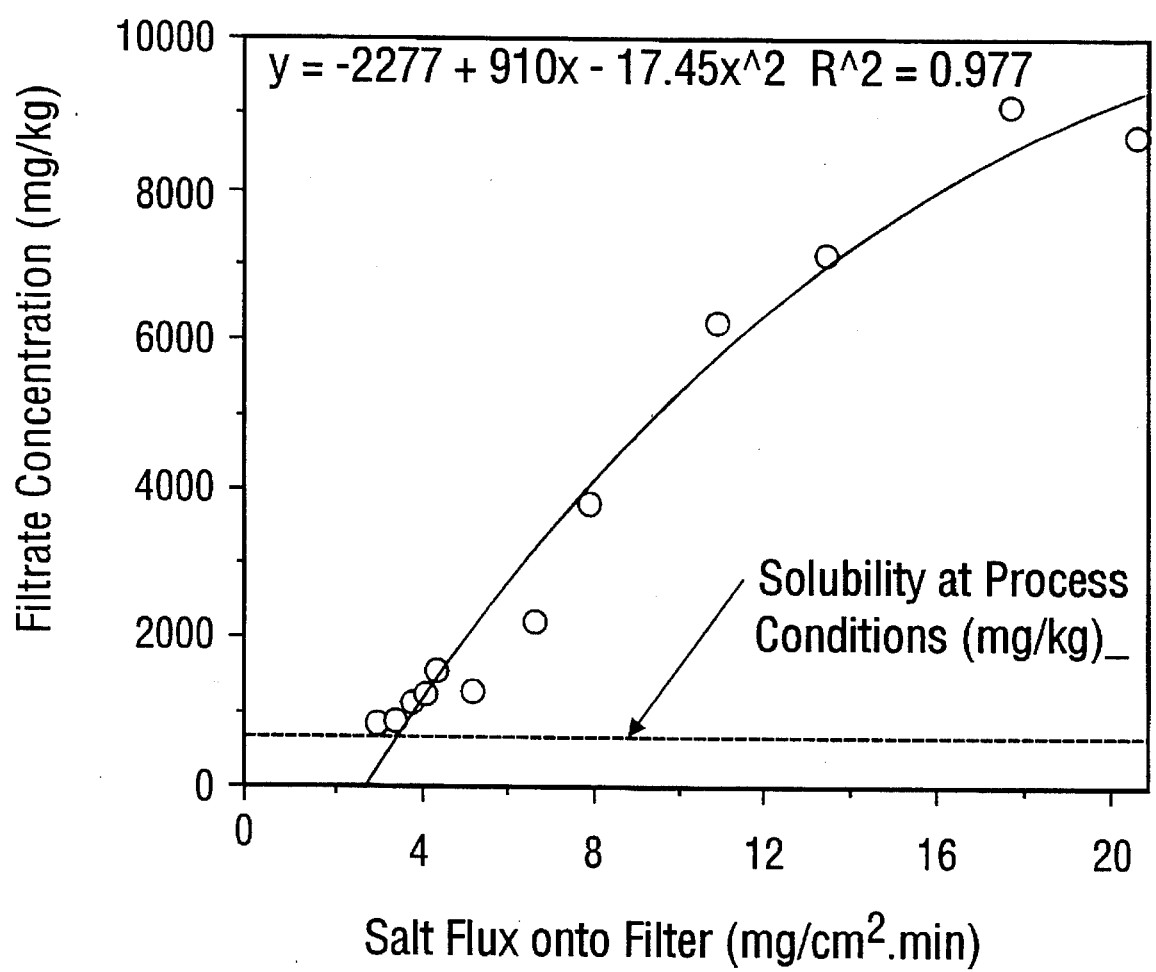
FIG. 7 shows the filtrate concentration as a function of average salt flux onto the filter.

$Q_{filtrate}$=Volumetric flow rate of filtrate (kg/hr)
$C_{feed}$=Feed concentration (mg/kg)
$A_{filter}$=Surface area of the filter (cm$^2$)
where the salt flux ($J_{salt}$) is expressed in mg/cm$^2$.s. The results showed an excellent correlation between the filtrate concentration and the salt flux onto the filter (FIG. 7).

The following account might provide some insight into how the filtrate concentration was affected by the salt flux onto the filter. Sodium nitrate was present as a molten liquid in the filter. Because of the pressure drop across the filter, a suction force existed causing fluid to flow towards the filter membrane. In addition, the increase in pressure drop across the filter as the salt concentration in the system increased indicated the formation of a fluidized cake of sodium nitrate along the filter. The sodium nitrate was prevented from passing through the pores of the filter by the surface tension of the molten salt phase. However, as the salt flux onto the filter increased, so did the pressure drop. This pressure drop eventually provided enough energy to overcome the resistance to passage provided by the surface tension. The lower part of the curve was explained by the effect of the solubility on the filtrate concentration. At low salt fluxes, the solubility limit governed the filtrate concentration as discussed in the previous section. The top part of the curve indicated the existence of an equilibrium position.

The optimal operation point is determined by the required effluent criteria as well as by the feed concentration and

TABLE 4

Test Results for Sodium Nitrate Experiments

| Experiment ID Number | Filtrate Concentration (mg/kg) | Separation Efficiency (%) | Mass Balance (%) | pH Feed | pH Retentate | pH Filtrate |
|---|---|---|---|---|---|---|
| 2-1   | 836  | 84.6 | 95.6   | 9.3 | 10.3 | 3.5 |
| 2-2   | 818  | 84.0 | 94.2   | 9.7 | 10.9 | 4.4 |
| 2-3   | 3410 | 40.5 | 115.9  | 6.9 | 7.0  | 4.2 |
| 2-4   | 1180 | 76.8 | 85.3   | 9.8 | 11.1 | 3.9 |
| 2-5A  | 1360 | 78.0 | 102.9  | 9.3 | 6.0  | 3.1 |
| 2-5B  | 1460 | 71.7 | 102.9  | 9.3 | —    | 3.1 |
| 2-6   | 1250 | 78.0 | 82.4   | 9.3 | 9.0  | 3.5 |
| 2-7   | 2130 | 81.6 | 114.6  | 4.9 | 11.2 | 3.8 |
| 2-8   | 3730 | 71.5 | 122.8  | 8.3 | 10.7 | 3.4 |
| 2-9   | 6140 | 68.7 | 115.9  | 6.0 | 10.8 | 4.2 |
| 2-10  | 7030 | 69.2 | 106.3  | 9.6 | 10.6 | 3.3 |
| 2-11  | 7810 | 65.2 | 121.1  | 9.6 | 9.8  | 3.8 |
| 2-12  | 9030 | 60.7 | 119.4  | 9.6 | 9.0  | 3.3 |
| 2-13  | 8550 | 62.2 | 96.6   | 9.3 | 7.4  | 3.5 |
| 2-14A | 1060 | 77.5 | —      | 6.1 | 10.4 | 3.5 |
| 2-14B | 1500 | 67.0 | —      | 6.1 | 10.2 | 3.6 |
| 2-14C | 2610 | 41.4 | 125.5* | 6.1 | 10.3 | 5.8 |

*Mass Balance for 2-14A, B, C characteristics. Because of the definition of the salt flux, this optimum can be achieved by changing the feed flow rate, the filtrate flow rate or the feed concentration. For practical application, it is believed that the feed mass flow rate is the easiest parameter to adjust.

An average salt solubility was calculated to determine the effect of the salt solubility on the separation efficiency. The calculation also required an average fluid density. Since the system pressure was the same (27.6 MPa) for every experiment, the average density was only a function of the temperatures along the filter element. Different filtrate flow profiles were used to calculate the average fluid density along the filter. This was done to evaluate the influence of the filtrate profile on the average density and thus on the salt solubility. A constant velocity profile and an exponentially decreasing velocity profile were tested. In addition, velocity profiles that decreased to the first, second, and third order with distance were evaluated. The sodium nitrate solubilities for the different profiles were calculated.

Figure 8:
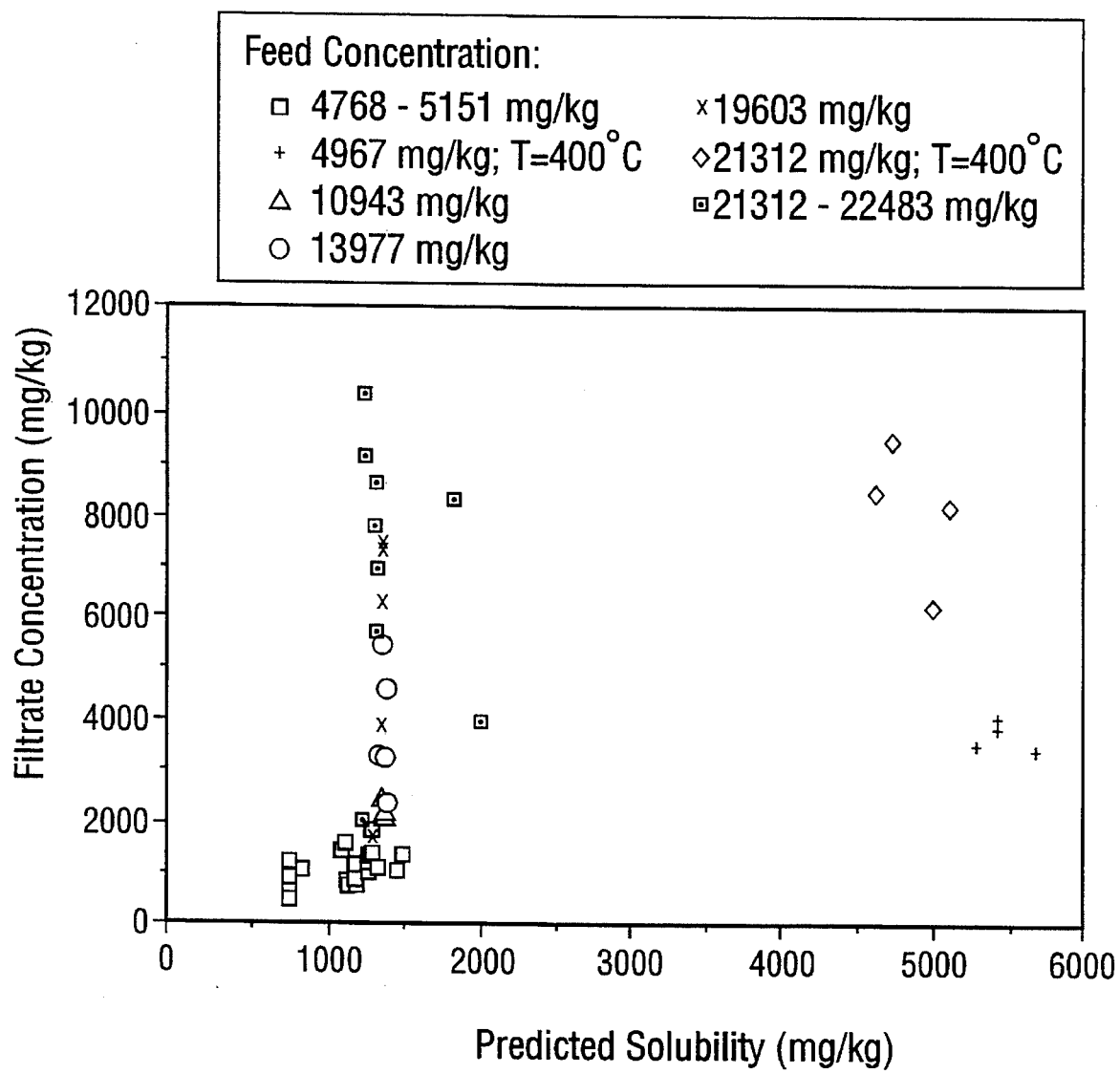
FIG. 8 shows the correlation between the filtrate concentration and the salt solubility.

FIG. 8 compares the observed filtrate concentration with the predicted salt solubility under the experimental conditions. The deviation of the predicted salt solubility increases with increasing feed concentration, increasing filtrate flux, and increasing feed rates. At low feed concentrations the experimentally observed filtrate concentration is within 10% of the predicted solubility. Therefore, the filtrate concentration may be governed by factors other than salt solubility. However, the maximum achievable salt separation seemed to be limited by solubility limit under the process conditions. Since the soluble portion of the salt is still present as a dissociated species, these ions with diameters in the order of Angstroms cannot be excluded by a filter with 0.5 μm pore size.

Figure 9:
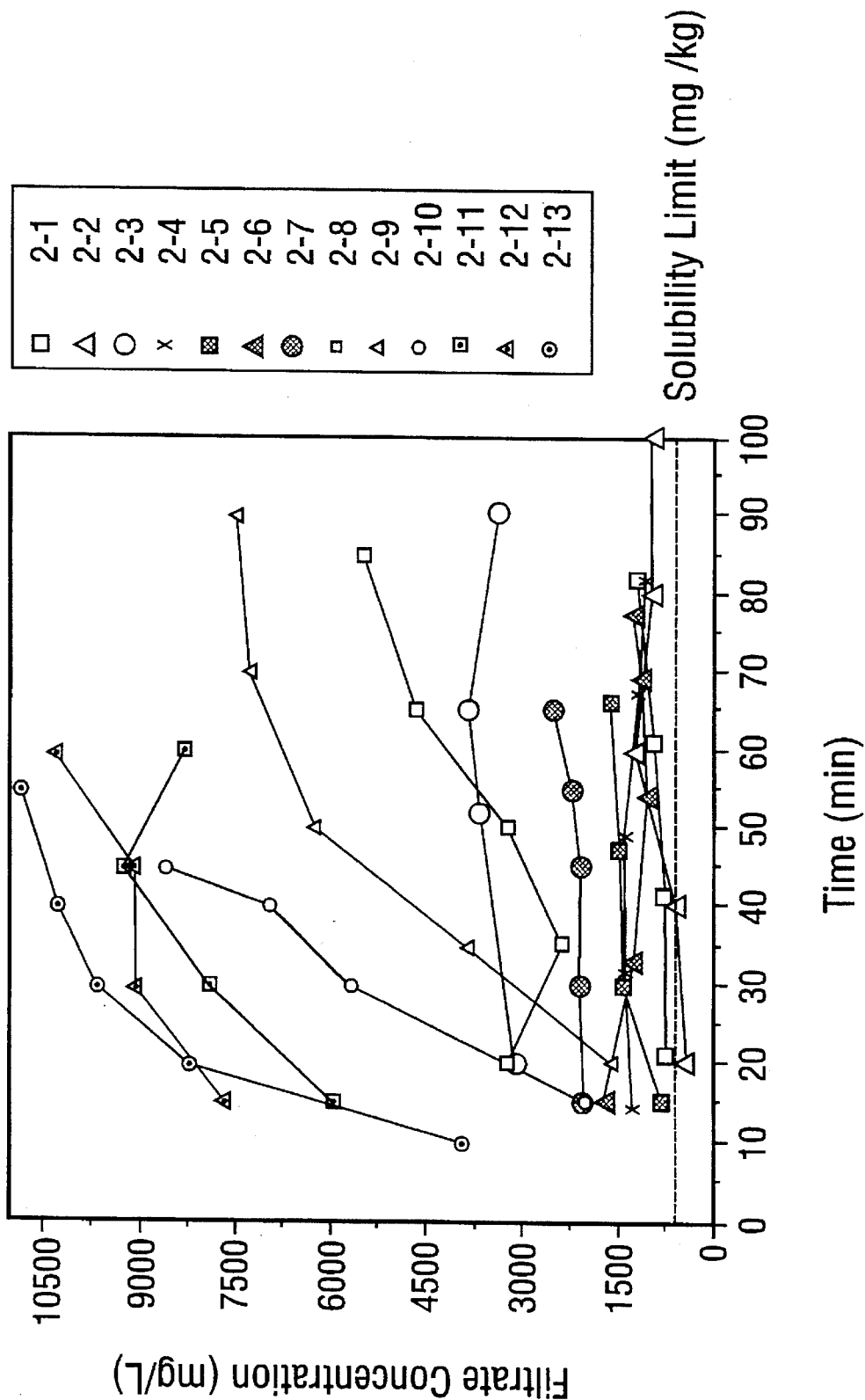
FIG. 9 shows the filtrate concentration over time for sodium nitrate experiments.

The filtrate concentration for the experiments 2-1 through 2-13 is plotted against time in FIG. 9. The solubility of sodium nitrate in supercritical water at the specified test conditions (about 700 mg/kg) appeared to be the lower limit of filtrate concentration. These experiments were conducted at three nominal feed concentrations: 5000 mg/L, 10000 mg/L, and 20000 mg/L. For the experiments with a feed concentration of 5000 mg/L, the filtrate concentration maintained a steady level near the salt solubility limit. As the feed concentration increased, the filtrate concentration reached a much higher level, and continued to increase with time. The initial feed concentration should be at the solubility limit of the salt and the salt is substantially insoluble under supercritical conditions.

Figure 10:
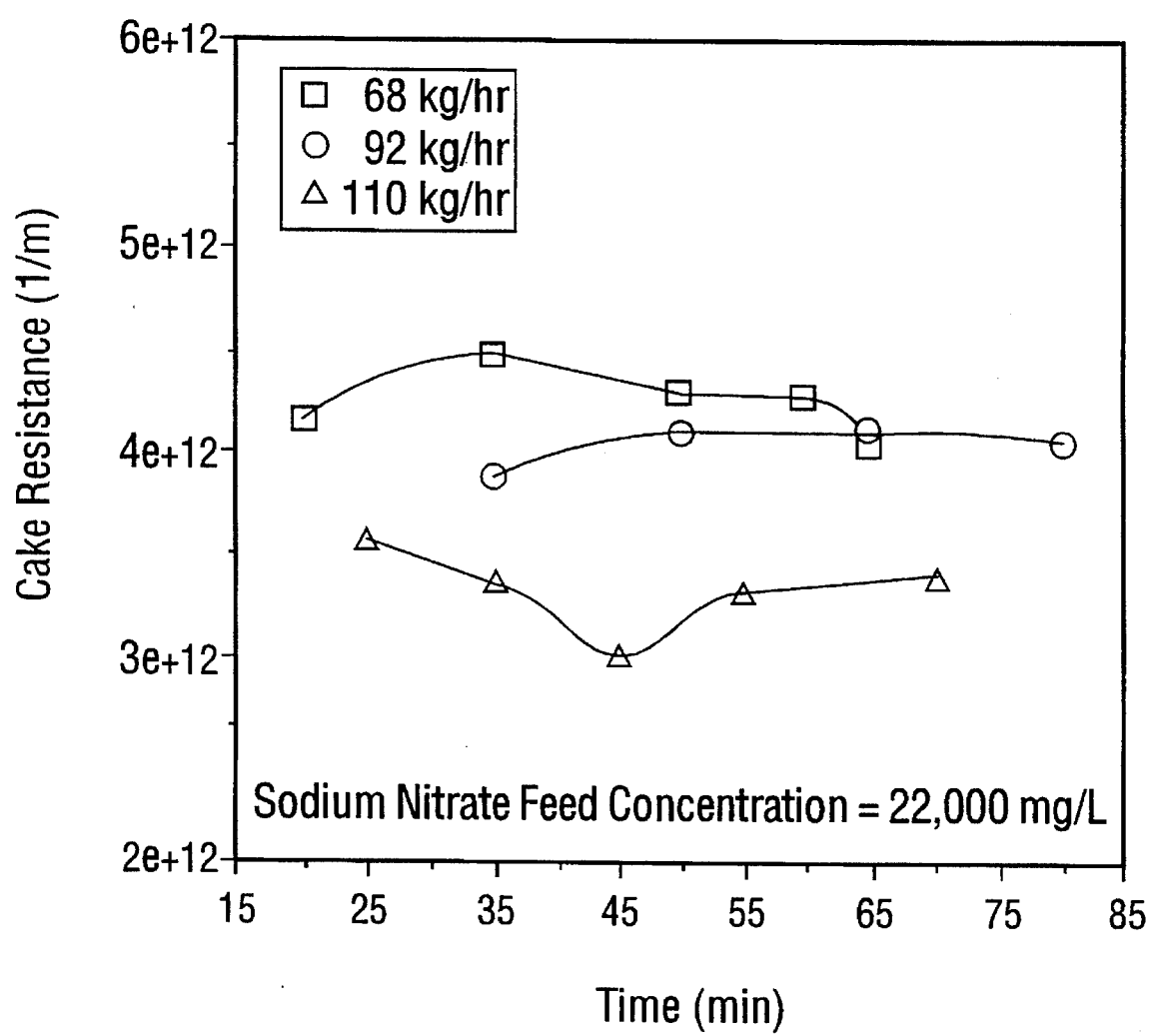
FIG. 10 shows cake resistance over time for different feed flow rates (feed concentration≈22,000 mg/L).
Figure 11:
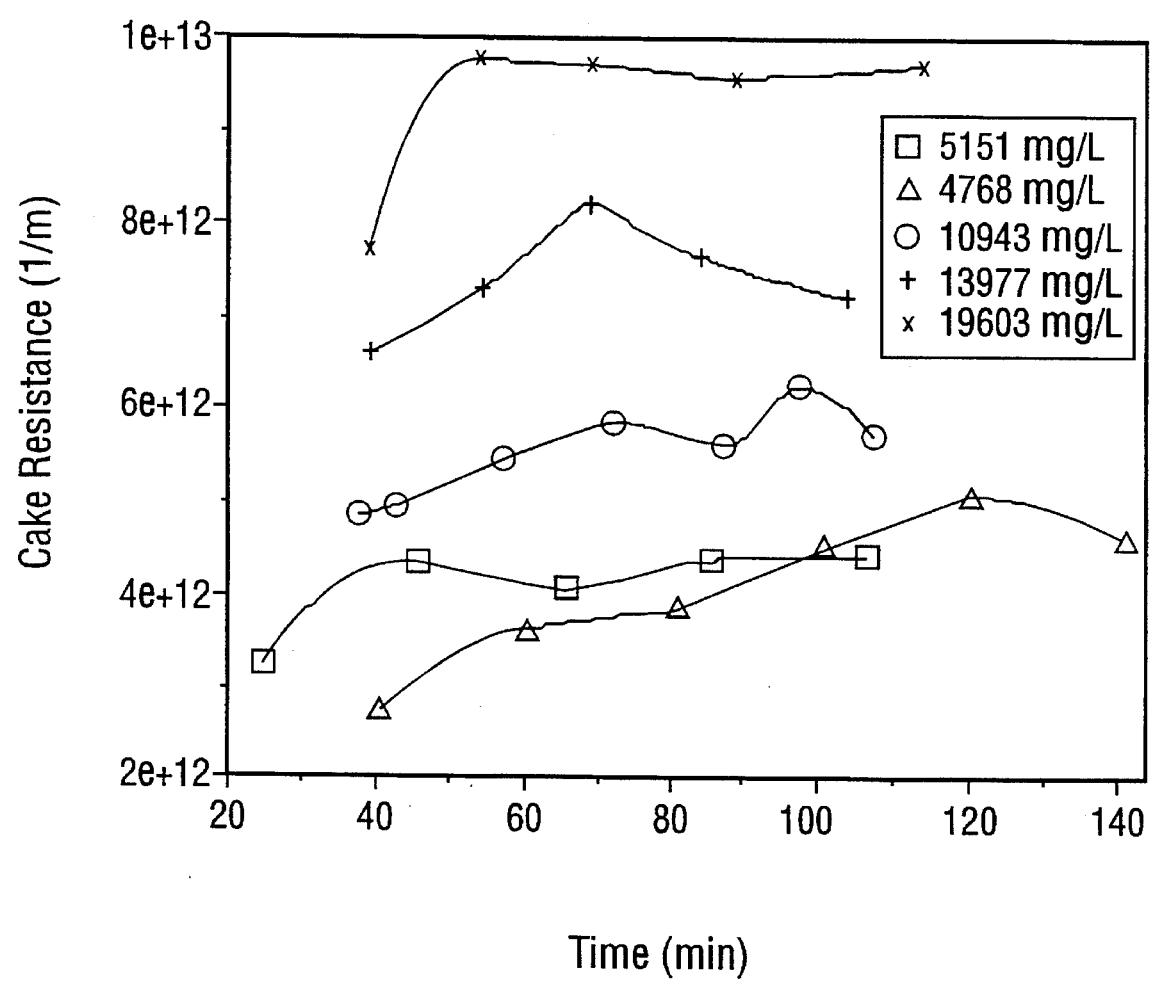
FIG. 11 shows cake resistance over time for different feed concentrations (feed mass flow rate=92 kg/hr).

FIGS. 10 and 11, respectively, show the effects of feed flow rate and feed concentration on the cake resistance. The cake resistance increased with decreasing feed flow rate and increasing feed concentration. However, the cake resistance appeared to maintain relatively constant in all cases.

Figure 12:
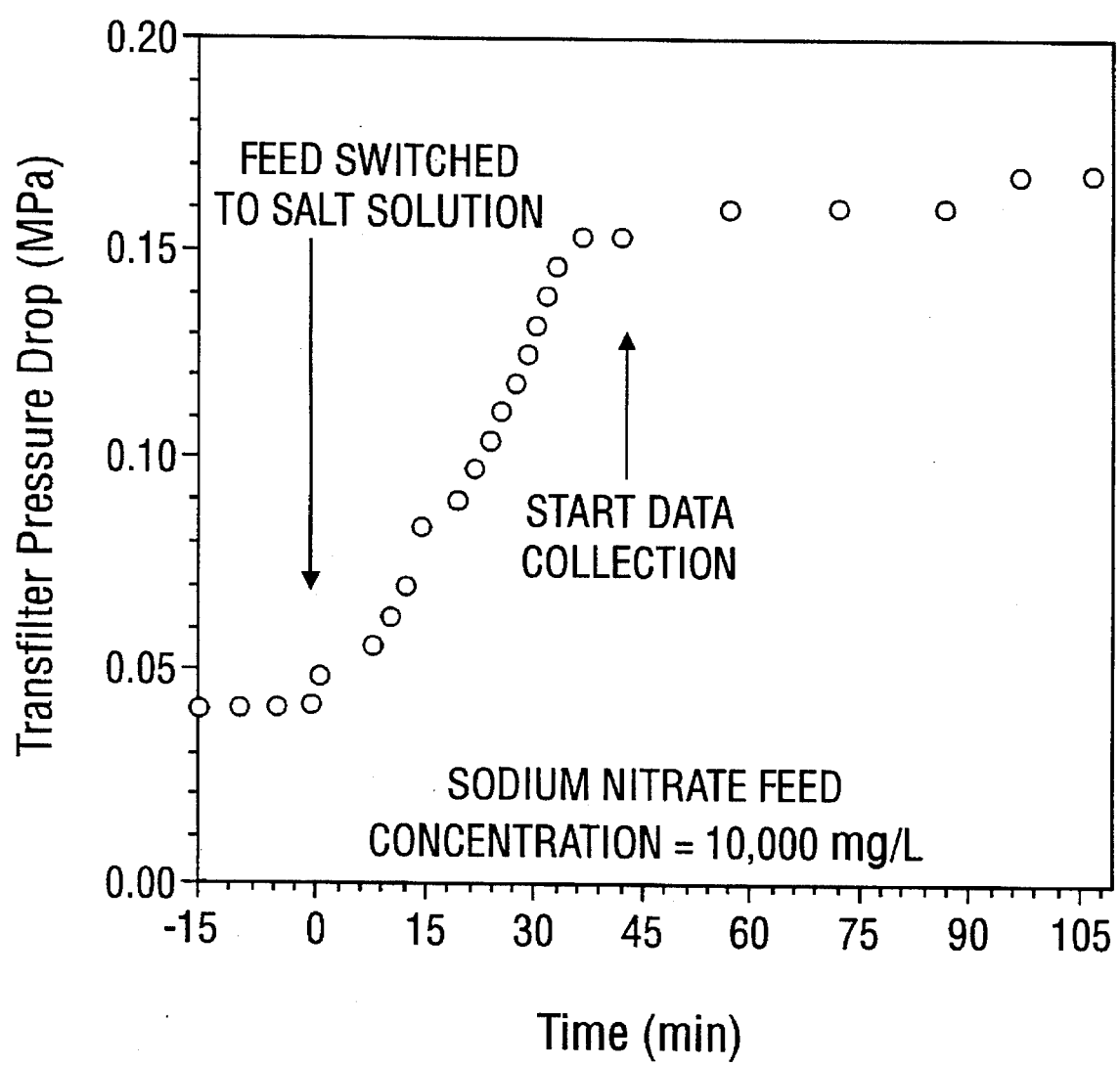
FIG. 12 shows a typical pressure drop profile during salt filtration experiments (10,000 mg/L $NaNO_3$ solution, 63 kg/hr feed mass flow rate).
Figure 13:
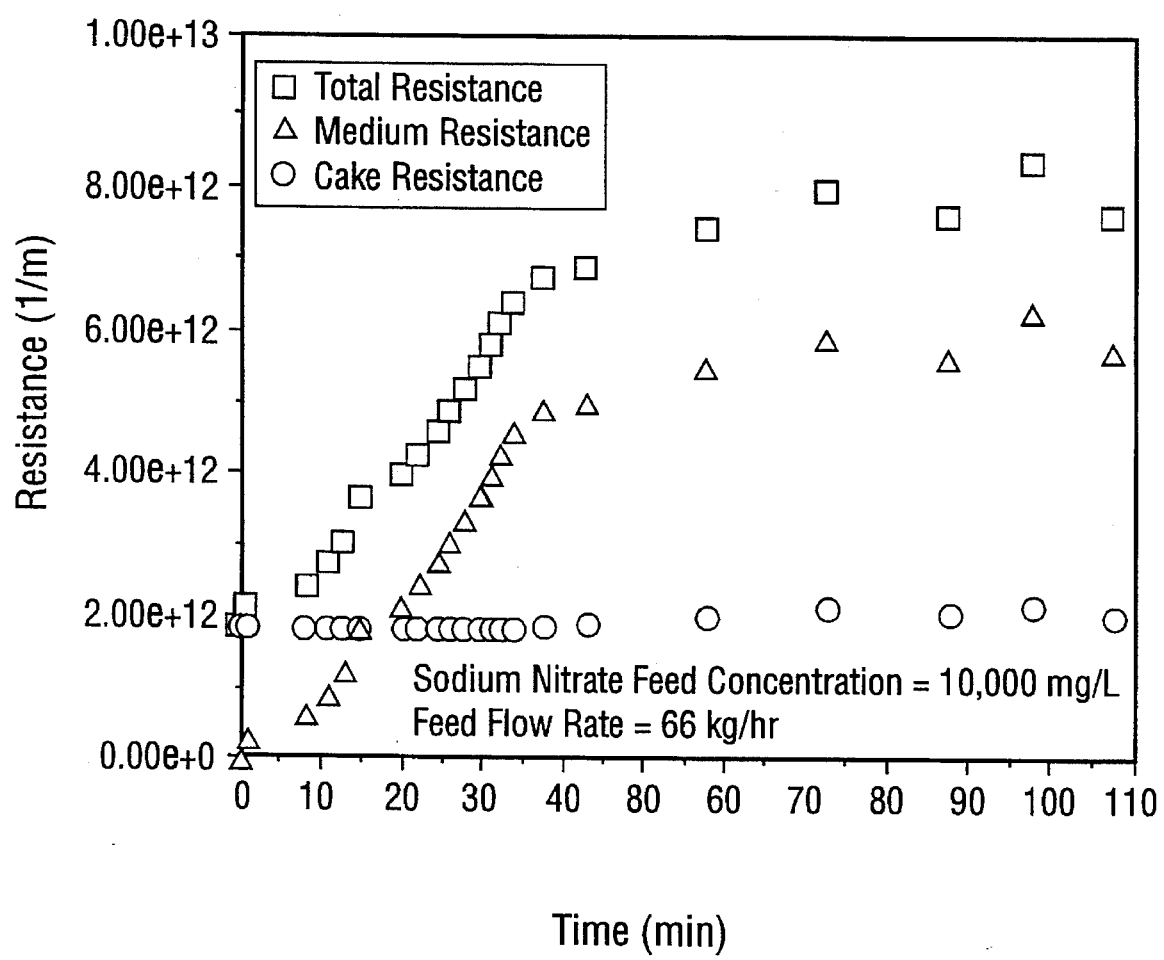
FIG. 13 shows medium, cake and total resistance over time during salt filtration experiments (10,000 mg/L $NaNO_3$ solution, 63 kg/hr feed mass flow rate).

Pressure drop across the filter element was also measured. FIG. 12 shows a typical pressure drop curve. Medium resistance can be calculated using the pressure drop data. FIG. 13 incorporates the medium, cake and total resistance as a function of time.

EXAMPLE 2

PARTICLE SEPARATION UTILIZING CROSS-FLOW FILTRATION

Two oxides (silica and α-alumina) were tested. Silica was selected to provide baseline separation efficiency data relating to hydrocyclones. However, silica exhibits relatively high solubility in supercritical water. To minimize the material loss due to dissolution, α-alumina was used.

Particle tests. Particle separation experiments were conducted at a feed concentration of 1,000 mg/L, a pressure of 27.6 MPa, and three supercritical water temperatures (390° C., 410° C., and 420° C.). Feed flow rates ranged from 70 kg/hr to 109 kg/hr. The average feed velocity in the filter ranged from 0.035 m/s to 0.122 m/s. These test conditions are summarized in Table 9. Additional tests were conducted at 25° C. and low pressures. These low temperature and pressure experiments yielded information about the effect of the viscosity and allowed comparison between the effect of the shear rate on the transient filtrate flux under standard temperature and pressure and supercritical water oxidation conditions.

The particle injection system was only used for silica experiments. The positive shutoff valves before and after the injection tube of the particle injection system were closed. The injection tube was opened at the top and rinsed with tap water and deionized water. After the injection tube was filled with the specially prepared particle suspension the tube was closed and the two positive shutoff valves were opened. The HPLC pump was turned on and the suspension was injected into the feed stream.

Effects of feed flow rates, feed concentrations, and filter temperatures were studied to provide operational information. The experiment focused on the separation of α-alumina. Silica experiments were performed to evaluate the effect of the particle-water density differential, and the particle diameter on the filtrate flux decline over time.

TABLE 5

Test Conditions for Particle Separation Experiments

| Experiment ID Number | Feed Type | Average Filter Temp. (°C.) | Pressure (Mpa) | Volumetric Particle Concentration | Bulk Fluid Velocity (m/s) |
|---|---|---|---|---|---|
| 3-1 | α-Al$_2$O$_3$ | 420 | 27.6 | 4.11 × 10$^{-5}$ | 0.082 |
| 3-2 | α-Al$_2$O$_3$ | 420 | 27.6 | 4.11 × 10$^{-5}$ | 0.124 |
| 4-1 | α-Al$_2$O$_3$ | 25 | 1.65 | 8.10 × 10$^{-5}$ | 0.134 |
| 4-2 | α-Al$_2$O$_3$ | 25 | 0.41 | 2.51 × 10$^{-3}$ | 0.067 |
| 4-3 | α-Al$_2$O$_3$ | 25 | 0.36 | 2.51 × 10$^{-3}$ | 0.108 |
| 4-4 | α-Al$_2$O$_3$ | 25 | 1.76 | 2.51 × 10$^{-3}$ | 0.141 |
| 4-5 | α-Al$_2$O$_3$ | 390 | 27.6 | 8.66 × 10$^{-5}$ | 0.129 |
| 4-6 | α-Al$_2$O$_3$ | 390 | 27.6 | 8.66 × 10$^{-5}$ | 0.187 |
| 4-7 | α-Al$_2$O$_3$ | 410 | 27.6 | 4.74 × 10$^{-5}$ | 0.276 |

TABLE 5-continued

Test Conditions for Particle Separation Experiments

| Experiment ID Number | Feed Type | Average Filter Temp. (°C.) | Pressure (Mpa) | Volumetric Particle Concentration | Bulk Fluid Velocity (m/s) |
| --- | --- | --- | --- | --- | --- |
| 4-8 | $\alpha$-$Al_2O_3$ | 410 | 27.6 | $4.74 \times 10^{-5}$ | 0.424 |

Figure 14:
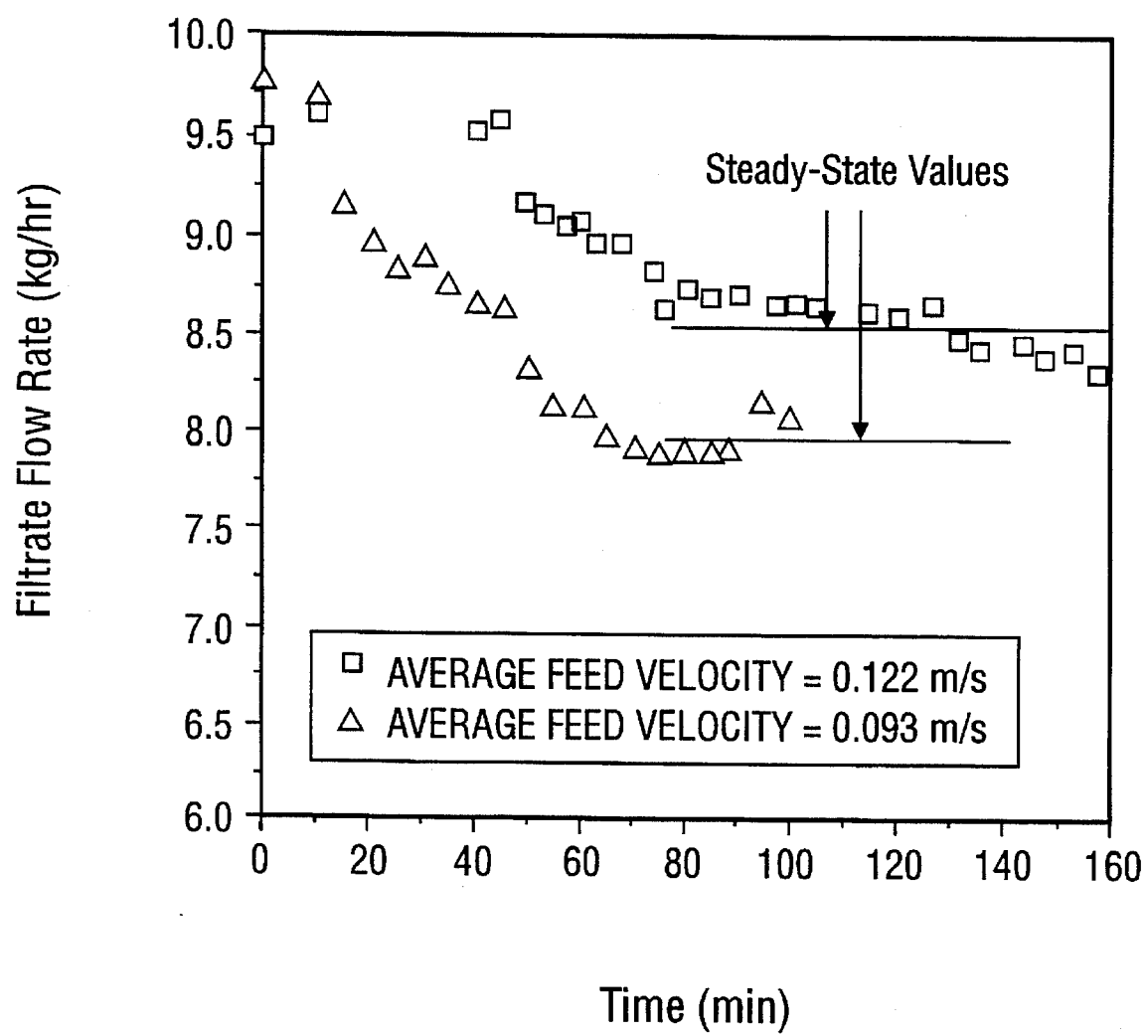
FIG. 14 shows oxide separation experiments: filtrate flow rate decrease over time for two feed velocities.
Figure 15:
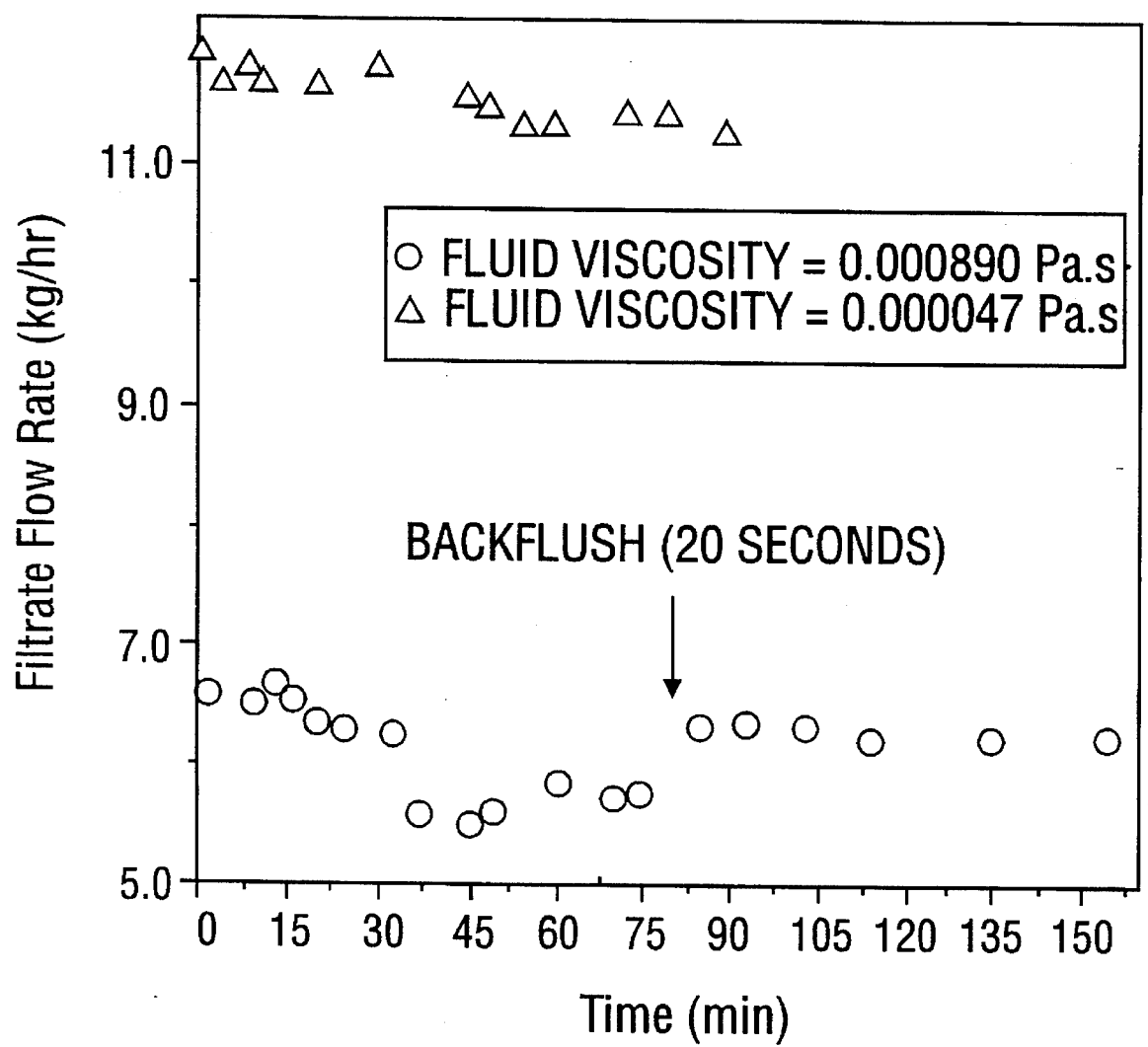
FIG. 15 shows oxide separation experiments: effect of viscosity on the filtrate flow rate.

FIG. 14 shows the effect of feed velocity on the filtrate flow rate. The filtrate flow rate appeared to approach a steady-state level after about one hour of operation. The decrease of the filtrate flow rate was about 20% and 15%, respectively, for average feed velocities of 0.093 m/s and 0.122 m/s. FIG. 15 further depicts the effect of fluid viscosity on the filtrate flow rate. The filtrate flow rate increased nearly 100% when the fluid viscosity decreased about 20 times. It was also demonstrated that within a quick backflush (20 seconds) after an operation period of 75 min, the filtrate flow rate was restored to 90% of the initial level.

EXAMPLE 3

CROSS-FLOW FILTER DESIGN

The cross-flow filters used in this study for high-pressure and high-temperature applications are an important aspect of the present invention. To meet the supercritical water oxidation process requirements, the following design considerations were made: (a) the filter housing and filter element attachment; (b) material corrosion; (c) fouling; (d) process control; and (e) process optimization.

A filter housing was designed which could not only meet the pressure and temperature requirement, but also provide a mechanism to attach the replaceable filter element. Reflange and Taper-Lok flanges were able to handle pressure and temperature shocks after some adjustments. The original R-CON flanges (Reflange, Houston, Tex.) were very susceptible to leakage when subject to system temperature and pressure shocks. However, after a short release of supercritical steam the flanges usually re-sealed. No permanent damage to the seal rings occurred during the salt separation experiments since no abrasive particles were present in the medium. During the oxide separation experiments, the oxides caused channeling on the seal ring surface. A modified R-CON design was used subsequently. A SS316L cylinder (OD=5.08 cm; ID=3.80 cm; L=±10 cm) was installed to shield the seal ring from temperature and pressure shocks. The cylinder permitted heat transfer thus creating less severe temperature fluctuations in the vicinity of the seal ring. In addition, the cylinder provided some dampening of pressure shocks at the seal. This modification proved to be successful during the remainder of the experiments with a total of about 200 hours of operation. The Taper-Lok flanges, with minimum adjustments, proved to be reliable to temperature and pressure cycles.

Porous metal tubes were used as filter elements because of their mechanical strength. The porous metal tubes were ordered from Mott Metallurgical Corp., Farmington, Conn., and Newmet Kregsoge. These tubes were delivered with seven centimeter long pieces of regular non-porous tubing welded at each end. These tubings were of the same material as the porous metal tube. Therefore, the filter elements could easily be attached (welded) to the filter housing. The filter element was centered by four spacers at the end of the filter element as shown in FIG. 10. The filter element was attached to the one end of the filter housing to prevent filter cracking due to thermal expansion differences between the filter housing and element.

No appreciable fouling of the filter occurred at various conditions of the sodium nitrate separation experiments. This observation could be contributed to the fact that sodium nitrate was in a molten state at the test temperatures. For the $\alpha$-alumina separation experiments, however, the extend of fouling and cake formation was a strong function of the fluid viscosity and shear rate. Filtrate flux deterioration over time was significantly reduced when the cross-flow filtration devices were operated at elevated temperatures and pressures, as compared to experiments conducted at low temperatures and pressures. It was also found that the filter could be restored to initial conditions after operation at supercritical water oxidation conditions. Restoration was achieved by rinsing and backflushing under both supercritical water oxidation and standard temperature and pressure conditions. The restoration was not possible after low pressure and low temperature operations. The importance of the shear rate was demonstrated using two filters. Shear rates were 10 to 100 times higher in the second filter than they were in the first one. Increase in the shear rate significantly reduced particle penetration into the filter matrix.

Before cross-flow filters can be implemented in a commercial supercritical water oxidation unit process control problems need to be addressed. First, the retentate stream needs to be recycled prior to pressure and temperature led-down devices. A modified check-valve design is currently being tested. This device provides a 1 MPa pressure increase to the retentate stream prior to injection into the feed stream. The pressure increase is generated by an HPLC pump and transmitted to the retentate by hydraulic means. The installation of a recirculation loop would significantly improve the cross-flow filtration potential. With the experimental setup used in this example, pressure control problems occurred during metal oxide separation studies after approximately 90 minutes of operation. System pressure was controlled by the retentate stream. The particles present caused erosion of the trim and channeling of the trim-seat in the pressure control valve. Therefore, provisions need to be made to allow for solids collection in a batch-wise fashion. This can be achieved by cyclone, settling vessel, or deep-bed filter operations. In addition, changes need to be made to allow for system pressure to be controlled by the filtrate stream rather than the retentate stream.

Corrosion of SS316L was observed during salt separation studies in the absence of oxygen. Effluent samples were analyzed for Cr, Ni, Zn, Zr, Mo, and Fe during the preliminary testing period. Hexavalent chromium was the predominant metal ion found in the effluent. The chromium concentrations ranged from up to 5 mg/L in the filtrate stream, and from 5 mg/L to 35 mg/L in the retentate stream and the rinse water. Iron, molybdenum, and nickel levels were below about 0.2 mg/L. The corrosion products were mainly collected in the retentate stream. In addition, corrosion product concentrations were as high as 30 mg/L in the rinse water collected during rinsing of the system at ambient conditions. This result indicated that the corrosion products (mainly sodium chromate) were highly insoluble at supercritical water oxidation conditions.

Optimization of the design of a filtration system is achieved by designing the proper flow rate. The filtrate flux approaches a maximum value asymptotically with suspension velocity and pressure drop. Exceeding the optimal value for the transmembrane pressure drop and the feed flow rate would cause an unnecessary energy expenditure. The practical limit for the pressure drop is about 0.35 MPa.

EXAMPLE 4

CROSS-FLOW FILTRATION WHERE MULTIPLE SALT SPECIES ARE PRESENT

Various equilibria exist among species found in a supercritical water-salt (sodium nitrate, for example) mixture. These equilibria can be expressed as follows:

Overall Equilibrium: $NaNO_3(solid) + H_2O(vapor) \rightleftharpoons NaOH(solid) + HNO_3(vapor)$ Hydration Equilibrium for Sodium Nitrate: $NaNO_3(solid) + nH_2O(vapor) \rightleftharpoons NaNO_3 \cdot nH_2O(vapor)$ Hydration Equilibrium for Sodium Hydroxide: $NaOH(solid) + nH_2O(vapor) \rightleftharpoons NaOH \cdot nH_2O(vapor)$ where n represents the number of water molecules for each dissolved molecule of a given species, and the description in the parentheses indicates in what phase these species exist. However, if the process temperature is higher than the melting point of a given species, the liquid phase should apply. Since solids or liquids are heavier than vapors, the solid or liquid fractions of sodium hydroxide and sodium nitrate tend to stay at the bottom of the crossflow filter assembly as a result of the gravitation.

The above description agrees with the observations described in Example 1 where a high-pH (NaOH-rich) retentate is obtained from the bottom of the filter assembly (FIG. 5) and a low-pH ($HNO_3$-rich) filtrate is obtained from the top of the filter assembly.

Because of these equilibria, the product distribution and separation efficiency for a given species may be adjusted by adding other salt, acid, or base species. This adjustable feature may be particularly critical for processing salts derived from either weak acid and strong base or strong acid and weak base.

EXAMPLE 5

CROSS-FLOW FILTRATION FOR PROCESSING SODIUM CHLORIDE (NaCl) AQUEOUS SOLUTIONS

Similar to the equilibria presented in Example 4, the following equilibria exist among various species in a $NaCl-H_2O$ mixture at elevated temperature and pressure:

Overall Equilibrium: $NaCl(s) + H_2O(v) \rightleftharpoons NaOH(l) + HCl(v)$

Hydration Equilibrium for Sodium Chloride: $NaCl(s) + nH_2O(v) \rightleftharpoons NaCl \cdot nH_2O(v)$ Hydration Equilibrium for Sodium Hydroxide: $NaOH(l) + nH_2O(v) \rightleftharpoons NaOH \cdot nH_2O(v)$ where n represents the number of water molecules for each dissolved molecule of a given species, and s, l and v in the parentheses, respectively, indicate solid, liquid, and vapor phases. Under the conditions of interest, i.e., the practical ranges of temperature and pressure for supercritical water oxidation applications, sodium chloride ($T_m=806°$ C.) is a solid and sodium hydroxide ($T_m=320°$ C.) is a liquid.

Sodium hydroxide solutions at elevated temperatures (>350° C.) are characterized by considerably stronger association of the ions than for NaCl solutions, which also leads to the higher vapor pressure of NaOH solutions. In other words, NaOH becomes a weaker electrolyte than NaCl at elevated temperatures. Table 6 summarizes critical parameters of the $NaCl-H_2O$ and $NaOH-H_2O$ systems. For each given temperature, the critical pressure is the maximum pressure required to maintain the binary in a single phase at any composition. Therefore, if a process pressure of 27.6 MPa (4000 psi) is used, there always exist two phases (one phase is water-rich and the other phase water-lean) at temperatures of 400° C.–550° C. for these binary systems. These equilibrium conditions provide separation limits for each binary system.

Because NaOH is a weaker electrolyte than NaCl at elevated temperatures, at a given condition the water-lean phase always contains more NaOH than NaCl by moles. For example, at 450° C. and 29 MPa, the water-lean phase consists of 23.8 mole % (40.9 mass %) of NaOH and 18.5 mole % (42.5 mass %) of NaCl, respectively.

It is postulated that NaOH (liquid) has higher affinity toward the NaCl (solid) surface than either water (vapor) or HCl (vapor). Therefore, NaOH tends to be rejected along with NaCl by the cross-flow filter and NaOH is to be found in the retentate. Similarly, HCl is to be found in the filtrate. The end result of the filtration process would be high-pH (NaOH-rich) retentate and a low-pH (HCl-rich) filtrate.

TABLE 6

| | Critical Parameters of the $NaCl-H_2O$ and $NaOH-H_2O$ Systems | | | |
|---|---|---|---|---|
| | $NaCl-H_2O$ | | $NaOH-H_2O$ | |
| Temperature (°C.) | Pressure (MPa) | NaCl (mole %) | Pressure (MPa) | NaOH (mole %) |
| 400 | 28.5 | 0.8 | 28.4 | 1.3 |
| 450 | 42.3 | 2.8 | 46.4 | 4.9 |
| 500 | 58.9 | 5.2 | 67.5 | 7.5 |
| 550 | 75.4 | 7.2 | 88.0 | 10.1 |

EXAMPLE 6

CROSS-FLOW FILTRATION APPARATUS FOR SEPARATION OF INORGANIC MATERIALS IN COMBINATION WITH OXIDATION OF ORGANIC AND INORGANIC MATERIALS

Figure 16:
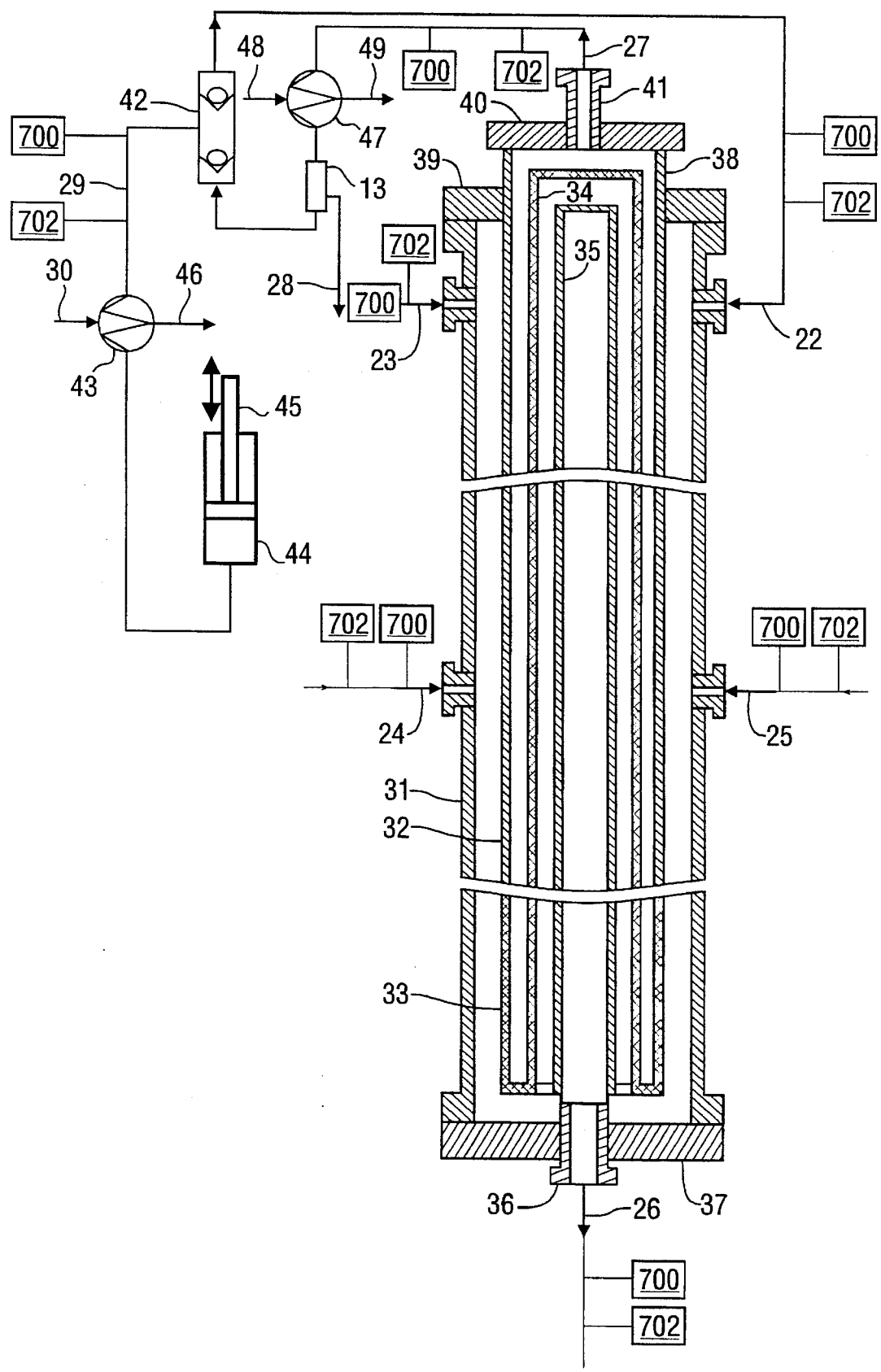
FIG. 16 is a diagram showing apparatus and process flow for a multiple-tube reactor arrangement.

With reference to FIG. 16, a modified apparatus and process flow are described as follows. Through line 22, the filtered and de-gassed reaction fluid may be recycled into the reactor vessel 31. This recycle fluid (through line 22) and an oxidant-containing fluid (through line 23) may be mixed and heated up by heat from counter-current heat exchange tube 32. As the mixture of recycle fluid and oxidant-containing fluid flows, it is heated via heat exchange with reaction fluid and reaches supercritical conditions for water. At some point (preferably when the mixture is at or nearly at supercritical conditions) the mixture then meets a feed stream (through line 24). The mixture mixes with the feed stream and forms a reaction fluid at supercritical conditions. Additional oxidant(s) or a second feed may be introduced through line 25, if needed.

The apparatus and process described above provide for the cold feed fluid to be heated rapidly and directly by mixing with the hot, oxidant-rich recycle fluid. The ratio of oxidant-rich recycle fluid vs. feed fluid is maintained at such a level that temperature of the feed may be increased relatively quickly to start an oxidation reaction. Hence unwanted reaction by-products that are produced when the feed and the oxidant are together at lower temperature are reduced. As the reaction mixture flows downwards, it preferably reaches an in situ crossflow filtration attachment in the outer annular section 33 and in the inner annular section 34. In FIG. 16 the crossflow filtration attachments are represented by the double-hatched lines in sections 33 and 34. The attachments 33 and 34 preferably may comprise porous metal tubes with a pre-selected pore size or pore size distribution. The filtered reaction fluid flows upwards through the annular section between tube section 33 and 32, and tube 34. The length of tube 33 may vary (or even be zero) depending upon the required crossflow filtration area. At a given flux, the filtration rate is approximately proportional to the filter area.

The crossflow filtration process continues as the reaction fluid flows upwards through the annular section between tube 34 and tube 35. The concentrated reaction fluid then flows downwards through tube 35. Some reaction fluid (may be considered as retentate) then flows through line 26, and comprises a relatively high concentration of metal oxides, hydroxides and salts. It leaves the reaction vessel for further treatment.

It is desired that the hot recycle fluid be repressurized to return it to the reactor. Present commercial pumps are generally expensive and wear relatively quickly at high temperature, supercritical, or near-supercritical water conditions. "High temperatures" in this context, means at a temperature of greater than about 400° F. (about 204° C.); "near-supercritical" in this context means greater than about 650° F. (about 343° C.) but less than about 705° F. (about 374° C.). Accordingly, FIG. 16 shows a novel preferred pump assembly recycle means that pressurizes fluids at high temperatures, supercritical, or supercritical water conditions without contacting the pump to those conditions. This pump assembly is arranged using assemblies of known check valves (42), heat exchangers (43), cylinders (44), and pistons (45).

The hot reaction product fluid 27 comprises mostly water and dissolved gaseous products. It first passes through a heat exchanger 47 to cool down the stream 22 to a subcritical temperature, and then enters a gas-liquid separator. The gas-liquid separator is preferably as shown in parent application Ser. No. 07/743,520, although other means to separate gas and liquid are well known in the art (e.g., settling tanks, de-misting equipment, membranes, etc.). The gas leaves the process in conduit means 28, while the remaining fluid 22 is recycled back into the vessel 31. The recycling of stream 22 may be achieved through a high temperature and high pressure dual check valve assembly 42 (or two individual check valves may be used).

In FIG. 16, a first check valve means in assembly 42 is connected to a piston 45 and cylinder 44 assembly through line 29. The fluid in line 29 moves back and forth pursuant to the pumping action of the piston 45. The reciprocating action of the piston 45 is transmitted via the fluid-filled line 29 to the chamber within pump assembly 42 that is between the first check valve and the second check valve, and then through a second check valve in assembly 42. With every stroke of the piston 45 a portion of the fluid in line 29 is pushed into line 22 and a portion of the fluid from line 27 is drawn into line 29. In this manner pressurized recycle fluid is provided in line 22.

The content in line 29 near the piston assembly may be further cooled by the attached heat exchanger 43 so that liquid water is maintained in the piston assembly. The heat exchanger 43 tends to (1) increase the pumping efficiency because water at low temperature is much more incompressible, and (2) recover heat when the cool fluid 30 (preferably water) is converted into vapor 46 (preferably steam). In addition, the heat exchanger 43 maintains the piston 44 and cylinder 45 in a lower temperature environment, which lowers both capital and maintenance costs for the described system.

Alternately, the piston 44 and cylinder 45 may pump ambient or heated liquid (e.g. water) from another source (not shown) into line 29 to pressurize the liquid in assembly 42. In this manner the liquid in assembly 42 is still pressurized and the piston 44 and cylinder 45 are not contacted with high temperature, or near-supercritical water. The selection of materials to build the pressure vessels and the attachments (other than the previously described crossflow filtration attachments) is well known in the art.

The recycle fluid in line 22 generally carries a substantial amount of thermal energy which may be transferred to stream 23 and then the streams 24 and 25 in the reaction vessel 31. The preferred recycle ratio (stream 22 vs. stream 24) is further described in parent application Ser. No. 07/743,520. Items 36, 37, 38, 39, 40, and 41 are tube and flange attachments suitable for high pressure and high temperature operation.

The porous materials used for the crossflow filtration elements may also act as suitable catalysts for the reactions taking place within the reactor. The large surface area of the porous materials may contribute to the catalytic effect of these elements because most wet oxidation processes are catalyzed through the heterogeneous reaction mechanisms existing between the process fluid and the reactor surface. Preferred porous materials are noble metals, ceramics transition metals, metal oxides, or metal alloys. More preferred porous materials are stainless steel (316L, 321, 347), Hastelloy, Inconel, titanium, manganese oxide, cerium oxide, platinum, ruthenium, or mixtures thereof. The porous materials are preferably mounted on a substrate, in a manner similar to the way platinum catalysts are mounted for automobile catalytic converters. It is believed that the combination of the high surface area of the porous materials, together with the low densities of reactants at supercritical conditions, is the feature that makes porous materials suitable catalysts at supercritical conditions.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein or in the steps or in the sequence of steps of the methods described herein without departing from the spirit and scope of the invention as described in the follow-

What is claimed is:

1. A method of separating ion species, comprising the steps of:

introducing an aqueous feed stream comprising a first ion species and a second ion species into a separator at supercritical conditions for water to form a supercritical feed stream having a temperature of at least 374° C. and a pressure of at least 221 bar;

contacting the supercritical feed stream with a porous crossflow filtration element to form a filtrate and a retentate such that either the filtrate or the retentate comprises a greater weight percent of the first ion species than the weight percent of the first ion species in the supercritical feed stream.

2. The method of claim 1 wherein at least one of the first or second ion species is an associated ion species.

3. The method of claim 2 wherein at least one of the ion species is a salt.

4. The method of claim 1 wherein at least one of the first or second ion species is a dissociated ion species.

5. The method of claim 1 wherein either the filtrate or the retentate comprises a lower weight percent of the first ion species than the weight percent of the first ion species in the supercritical feed stream.

6. The method of claim 1 wherein the filtrate comprises a higher weight percent of the first ion species than the weight percent of the first ion species in the supercritical feed stream, and the filtrate comprises a lower weight percent of the second ion species than the weight percent of the second ion species in the supercritical feed stream.

7. The method of claim 1 wherein the retentate comprises a higher weight percent of the first ion species than the weight percent of the first ion species in the supercritical feed stream, and the retentate comprises a lower weight percent of the second ion species than the weight percent of the second ion species in the supercritical feed stream.

8. The method of claim 1 wherein the feed stream comprises a salt with a melting point lower than the temperature of the feed stream at supercritical conditions for water.

9. The method of claim 1 wherein at least one of the ion species is substantially insoluble in water at supercritical conditions for water.

10. The method of claim 1 wherein at least one of the ion species is substantially soluble in water at 300° C. and 20 MPa.

11. The method of claim 1 wherein at least one of the ion species is substantially insoluble at supercritical conditions for water, and that ion species is substantially soluble in water at 300° C. and 20 MPa.

12. The method of claim 1 wherein the filtrate has a lower pH than the pH of the feed stream.

13. The method of claim 1 wherein the retentate has a higher pH than the pH of the feed stream.

14. The method of claim 1, further comprising the step of measuring the pH of the filtrate or the retentate.

15. The method of claim 1 wherein the filtrate has a lower pH than the feed stream and the retentate has a higher pH than the feed stream.

16. The method of claim 1 wherein the filtrate has a pH that is at least 2 pH units above or below the pH of the retentate.

17. The method of claim 1 wherein the feed stream comprises an inorganic salt.

18. The method of claim 1 where the feed stream comprises a sodium nitrate solution and the filtrate comprises a higher weight percent of $HNO_3$ than the weight percent of $HNO_3$ in the supercritical feed stream.

19. The method of claim 1 wherein the feed stream comprises brine and the filtrate comprises a higher weight percent of HCl than the weight percent of HCl in the supercritical feed stream.

20. The method of claim 1 wherein the crossflow filtration element comprises a sintered metal or a ceramic material.

21. The method of claim 1 wherein the feed stream is introduced into a separator comprising a central chamber open at one end and closed at the other end, the central chamber being substantially surrounded by an annular chamber having a common wall with the central chamber, the wall including the porous crossflow filtration element and adapted to allow fluid to flow from the central chamber to the annular chamber, or vice versa.

22. The method of claim 1, further comprising the step of exchanging heat between the filtrate and the feed stream.

23. The method of claim 1, further comprising the step exchanging heat between the retentate and the feed stream.

24. The method of claim 1 wherein the supercritical feed stream is contacted with the crossflow filtration element such that solids in the supercritical feed stream are separated from the filtrate.

25. The method of claim 1, further comprising the step of varying feed stream flowrate, feed stream temperature, separator temperature, or feed stream first ion species weight percent as a function of the pH of the filtrate, retentate, or feed stream.

26. The method of claim 1, further comprising the step of varying feed stream flowrate, feed stream temperature, separator temperature, or feed stream first ion species weight percent as a function of the weight percent of an ion species in the filtrate or retentate.

27. The method of claim 1, further comprising the step of introducing a solid into the feed stream that is adapted to increase ion species aggregation in the separator during use.

28. The method of claim 1, further comprising the step of controlling differential pressure across the crossflow filtration element by controlling the flowrate of the filtrate, retentate, or both.

29. The method of claim 1 wherein the feed stream comprises a compound with a melting point higher than the temperature of the feed stream at supercritical conditions for water.

30. The method of claim 1 wherein the first and second ion species are selected from the group consisting of chlorides, fluorides, phosphates, sulfates, hydroxides, and nitrates of sodium, potassium, calcium, magnesium, aluminum, cesium, and copper.

31. A method of separating solids from an aqueous feed stream, comprising the steps of:

introducing the aqueous feed stream into a separator adapted for supercritical conditions for water, the separator comprising a porous crossflow filtration element, and contacting the aqueous feed stream with the porous crossflow filtration element at a temperature of at least 374° C. and a pressure of at least 221 bar to form a filtrate and a retentate, wherein the retentate has a higher weight percent of solids than the weight percent of solids in the filtrate.

32. The method of claim 31, further comprising the step of reacting the feed stream with an oxidant-containing stream at supercritical conditions for water.

33. The method of claim 31 wherein the separator comprises a central chamber open at one end and closed at the other end, the central chamber being substantially surrounded by an annular chamber having a common wall with the central chamber, the wall including the porous crossflow filtration element and adapted to allow fluid to flow from the central chamber to the annular chamber, or vice versa.

34. A method of removing organic or inorganic matter from an aqueous feed stream which comprises the steps of:

(a) contacting the feed stream with an oxidant-containing stream in a reaction zone at supercritical conditions for water for a time sufficient to oxidize organic matter to an oxidation product stream having a temperature of at least 374° C. and a pressure of at least 221 bar including water and carbon dioxide;

(b) flowing the product stream across a porous crossflow filtration element at supercritical conditions for water to separate solids from the product stream;

(c) cooling the product stream by heat exchange with the reactants in the reaction zone to form a hot condensate stream comprising water; and (d) recycling at least a portion of the hot condensate stream to mix with and heat the oxidant-containing stream prior to step (a).

35. The method of claim 34 wherein the reaction takes place in the presence of a catalyst.

36. The method of claim 34, further comprising the step of separating carbon dioxide from the reaction fluid by preferentially permeating carbon dioxide through a porous filter.

37. The method of claim 34, further comprising the step of segregating the carbon dioxide from the reaction fluid prior to preferentially permeating carbon dioxide through the porous material.

* * * * *

UNITED STATES PATENT AND TRADEMARK OFFICE
CERTIFICATE OF CORRECTION

PATENT NO. : 5,527,466
DATED : June 18, 1996
INVENTOR(S) : Lixiong Li, et. al.

It is certified that error appears in the above-indentified patent and that said Letters Patent is hereby corrected as shown below:

Title page, item [75], delete inventor "Marcel G. Goemmans" and insert-- Marcel G.E. Goemans--.

Signed and Sealed this

Third Day of June, 1997

*Attest:*

BRUCE LEHMAN

*Attesting Officer*        Commissioner of Patents and Trademarks